(12) United States Patent
Shibachi

(10) Patent No.: US 9,771,914 B2
(45) Date of Patent: Sep. 26, 2017

(54) POWER SUPPLY DEVICE FOR VEHICLE

(71) Applicant: FUJITSU TEN LIMITED, Kobe-shi, Hyogo (JP)

(72) Inventor: Yoshinori Shibachi, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 14/939,559

(22) Filed: Nov. 12, 2015

(65) Prior Publication Data

US 2016/0153418 A1 Jun. 2, 2016

(30) Foreign Application Priority Data

Nov. 28, 2014 (JP) ................................ 2014-240960

(51) Int. Cl.
*F02N 11/04* (2006.01)
*H02P 9/04* (2006.01)
*F02N 11/08* (2006.01)
*H02K 23/52* (2006.01)
*F02N 11/00* (2006.01)

(52) U.S. Cl.
CPC ...... *F02N 11/0866* (2013.01); *F02N 11/0814* (2013.01); *F02N 11/00* (2013.01); *F02N 2011/0885* (2013.01); *F02N 2011/0888* (2013.01); *Y02T 10/48* (2013.01)

(58) Field of Classification Search
CPC .................................................. F02N 11/0866
USPC .................................................. 290/31, 36 R
See application file for complete search history.

(56) References Cited

U.S. PATENT DOCUMENTS

| 5,097,140 | A | * | 3/1992 | Crall | ...................... | F02N 11/04 290/31 |
| 5,119,010 | A | * | 6/1992 | Shirata | ................. | B60L 11/005 320/110 |
| 5,250,786 | A | * | 10/1993 | Kikuchi | ............... | B23K 9/1056 219/130.32 |
| 5,287,831 | A | * | 2/1994 | Andersen | ................ | F02P 19/02 123/179.3 |
| 5,413,072 | A | * | 5/1995 | Andersen | .............. | F02N 11/105 123/145 A |
| 5,418,444 | A | * | 5/1995 | Cook | .................... | H02J 7/0024 320/125 |
| 8,159,078 | B2 | * | 4/2012 | Usselman | ............... | F02D 29/06 290/1 A |

(Continued)

FOREIGN PATENT DOCUMENTS

JP 2006029142 A 2/2006
JP 2011004556 A 1/2011

(Continued)

*Primary Examiner* — Pedro J Cuevas
(74) *Attorney, Agent, or Firm* — Oliff PLC

(57) ABSTRACT

A power supply device for a vehicle which is used in a vehicle, includes: a first switch unit that is provided between a power generator which is driven by an internal combustion engine of the vehicle and a secondary battery which is connected to the power generator and supplies electric power to a starting device for starting the internal combustion engine; a second switch unit that is provided between the power generator and a capacitor which accumulates electric power supplied by the power generator; and a control unit that controls the connection state of the first switch unit and the connection state of the second switch unit.

5 Claims, 19 Drawing Sheets

(56) References Cited

U.S. PATENT DOCUMENTS

| | | | | |
|---|---|---|---|---|
| 8,996,227 B2* | 3/2015 | Sisk | ................. | B60L 11/12 |
| | | | | 701/22 |
| 2007/0139975 A1* | 6/2007 | Yamauchi | ........... | B60L 11/1868 |
| | | | | 363/16 |
| 2009/0284022 A1* | 11/2009 | Usselman | ............... | F02D 29/06 |
| | | | | 290/38 R |
| 2012/0068537 A1* | 3/2012 | Hintz | ................ | B60L 11/005 |
| | | | | 307/43 |
| 2012/0235473 A1* | 9/2012 | Jiang | ................ | H01M 2/1072 |
| | | | | 307/9.1 |
| 2012/0235511 A1* | 9/2012 | Watson | ............... | H01M 2/1072 |
| | | | | 307/109 |
| 2012/0274077 A1* | 11/2012 | Usselman | ............... | F02D 29/06 |
| | | | | 290/1 A |
| 2012/0330538 A1* | 12/2012 | Spjuth | ................ | F02N 11/0866 |
| | | | | 701/113 |
| 2013/0229049 A1* | 9/2013 | Larsson | ............. | F02N 11/0814 |
| | | | | 307/9.1 |
| 2014/0009106 A1* | 1/2014 | Andrea | ................ | H02H 9/002 |
| | | | | 320/107 |
| 2014/0200755 A1* | 7/2014 | Sisk | ................. | B60L 11/12 |
| | | | | 701/22 |
| 2014/0366829 A1* | 12/2014 | Wu | ................. | F02N 11/087 |
| | | | | 123/179.3 |
| 2015/0300307 A1* | 10/2015 | Setterberg | ............ | F02N 11/087 |
| | | | | 701/113 |
| 2016/0040642 A1* | 2/2016 | Miyake | ............... | F02N 11/0866 |
| | | | | 290/31 |

FOREIGN PATENT DOCUMENTS

| | | | |
|---|---|---|---|
| JP | 2014012998 A | | 1/2014 |
| JP | 2016007111 A | * | 1/2016 |

* cited by examiner

FIG. 3

| VEHICLE STATE | | FIRST SW | SECOND SW | DDC | CONTROL STATE | |
|---|---|---|---|---|---|---|
| FIRST STARTING OF ENGINE | | ON | OFF | STOPPED | ELECTRIC POWER OF Pb IS SUPPLIED TO STARTER | ~R |
| FIRST CHARGING OF Cap | | ON | OFF | DRIVEN | DDC CHARGES Cap WITH ELECTRIC POWER OF Pb | ~R |
| RUNNING | | ON | OFF | DRIVEN | DDC SUPPLIES ELECTRIC POWER OF Cap TO ELECTRIC LOAD | ~R |
| DECEL-ERATING | AMOUNT OF Eli IS SMALL | ON | OFF | DRIVEN | DDC SUPPLIES ELECTRIC POWER OF Alt TO ELECTRIC LOAD AND DIRECTLY CHARGES Cap WITH ELECTRIC POWER OF Alt | ~R |
| | AMOUNT OF Eli IS MEDIUM | ON | OFF | DRIVEN | DDC CHARGES Cap WITH ELECTRIC POWER OF Alt | ~R |
| | AMOUNT OF Eli IS LARGE | ON | OFF | STOPPED | ELECTRIC POWER OF Alt IS SUPPLIED DIRECTLY TO ELECTRIC LOAD, AND ELECTRIC POWER OF Pb IS SUPPLIED DIRECTLY TO ELECTRIC LOAD | ~R |
| STOP (IDLING STOP) | | ON | OFF | DRIVEN | DDC SUPPLIES ELECTRIC POWER OF Pb TO ELECTRIC LOAD | ~R |
| RESTARTING | | OFF | ON | STOPPED | ELECTRIC POWER OF Cap IS SUPPLIED DIRECTLY TO STARTER | ~R |

Column labels above the table: MS, FS, SS, DC, CS. Table reference: 15b.

| CHARGED STATE | FIRST SW | SECOND SW | DDC | CONTROL STATE | |
|---|---|---|---|---|---|
| PbSOC ≦ 80[%] | ON | OFF | DRIVEN | Pb IS DIRECTLY CHARGED WITH ELECTRIC POWER OF Alt, AND DDC CHARGES Cap WITH ELECTRIC POWER OF Alt | R |
| [DETERIORATION PREVENTION LEVEL] < [VOLTAGE OF Cap] ≤ [RESTARTING SECUREMENT LEVEL] | ON | OFF | DRIVEN | DDC CHARGES Cap WITH ELECTRIC POWER OF Pb | R |

POWER SUPPLY DEVICE FOR VEHICLE

CROSS-REFERENCE TO RELATED APPLICATIONS

This application is based on and claims priority under 35 U.S.C. 119 from Japanese Patent Application No. 2014-240960 filed on Nov. 28, 2014, the entire content of which is incorporated herein by reference.

BACKGROUND

1. Technical Field

The present invention relates to a technology for controlling a rechargeable battery mounted on a vehicle.

2. Related Art

In the related art, there are known technologies for controlling charging and discharging of a capacitor and a lead battery mounted as rechargeable batteries on a vehicle. For example, JP-A-2011-4556 discloses a technology for enabling a power supply device for a vehicle connected to a lead battery and a capacitor to control electric loads such as a car audio system.

SUMMARY OF INVENTION

However, in order to drive an engine starter, a relatively large amount of instantaneous current is required unlike other electric loads such as the car audio system. Therefore, it is not always easy to appropriately manage the lead battery and the capacitor. For example, if the capacitor is not sufficiently charged, when the vehicle starts for the first time, the starter cannot be smoothly driven, and the sequence of idling stop and restart is frequently performed. Therefore, the lead battery easily deteriorates.

In view of above, an illustrative aspect of the present invention is to provide a technology for appropriately controlling charging and discharging of a plurality of rechargeable batteries mounted on a vehicle.

[1] An aspect of the present invention provides a power supply device for a vehicle which is used in a vehicle, including: a first switch unit that is provided between a power generator which is driven by an internal combustion engine of the vehicle and a secondary battery which is connected to the power generator and supplies electric power to a starting device for starting the internal combustion engine; a second switch unit that is provided between the power generator and a capacitor which accumulates electric power supplied by the power generator; and a control unit that controls the connection state of the first switch unit and the connection state of the second switch unit.

[2] The power supply device for a vehicle according to [1], may have a configuration in which: during first starting of the internal combustion engine, the control unit connects the first switch unit and opens the second switch unit, resulting in a first connection state in which electric power is supplied from the secondary battery to the starting device, and during restarting of the internal combustion engine from a temporal stop state thereof, the control unit opens the first switch unit and connects the second switch unit, resulting in a second connection state in which electric power is supplied from the capacitor to the starting device.

[3] The power supply device for a vehicle according to [1] or [2], may further include: a direct-current transducer that is provided between a first connection portion at which the secondary battery and the first switch unit are connected and a second connection portion at which the capacitor and the second switch unit are connected, and converts an input direct-current voltage into another direct-current voltage, and outputs the converted direct-current voltage, in which during the first starting of the internal combustion engine, the control unit connects the first switch unit and opens the second switch unit, resulting in a third connection state in which electric power which is generated by the power generator is supplied from the power generator to the capacitor through the direct-current transducer, and during decelerating of the vehicle, the control unit connects the second switch unit, resulting in a fourth connection state in which regenerative electric power which is generated by the power generator is supplied from the power generator to the capacitor without passing through the direct-current transducer.

[4] The power supply device for a vehicle according to any one of [1] to [3], may further include: an acquiring unit that acquires information on charged states of the secondary battery and the capacitor, in which, if the charged state of the secondary battery is equal to or lower than a first threshold value or the charged state of the capacitor is equal to lower than a second threshold value, regardless of a state of the vehicle, the control unit connects the first switch unit and opens the second switch unit, resulting in a fifth connection state.

[5] The power supply device for a vehicle according to any one of [1] to [4], may have a configuration in which: the first switch unit includes a first MOSFET, the second switch unit includes a second MOSFET, the first MOSFET has a parasitic diode connecting its drain and its source, and the anode and cathode of the parasitic diode are connected to the power generator and the secondary battery, respectively, and the second MOSFET has a parasitic diode connecting its drain and its source, and the anode and cathode of the parasitic diode are connected to the power generator and the capacitor, respectively.

[6] The power supply device for a vehicle according to [5], may have a configuration in which: after the control unit switches the first MOSFET from an ON state to an OFF state, the control unit turns on the second MOSFET, and after the control unit switches the second MOSFET from the ON state to an OFF state, the control unit turns on the first MOSFET.

According to [1] to [6], the connection state of the first switch unit and the connection state of the second switch unit are controlled, whereby it is possible to appropriately control charging and discharging of the secondary battery and the capacitor.

According to [2], when the internal combustion engine starts for the first time, electric power is supplied from the secondary battery to the starting device, whereby smooth starting is possible. Also, when the internal combustion engine restarts from a temporal stop state, electric power is supplied from the capacitor to the starting device, whereby it is possible to suppress discharging of the secondary battery, thereby preventing deterioration thereof.

According to [3], when the internal combustion engine starts for the first time, the generated electric power is supplied to the capacitor through the DC transducer, whereby it is possible to perform stable power supply device. Meanwhile, during decelerating of the vehicle, the regenerative electric power is supplied to the capacitor without passing through the DC transducer, whereby it is possible to supply the regenerative electric power to the capacitor, beyond the output capability of the DC transducer.

According to [4], on the basis of the charged states of the secondary battery and the capacitor, the first switch unit and the second switch unit are controlled regardless of the state of the vehicle. Therefore, it is possible to surely control charging of the secondary battery and the capacitor.

According to [5], it is possible to prevent a current from flowing from the secondary battery and the capacitor back to the starting device after charging of the secondary battery and the capacitor.

According to [6], it is possible to prevent the secondary battery or the capacitor from being short-circuited when the first MOSFET or the second MOSFET is switched between an ON state and an OFF state.

BRIEF DESCRIPTION OF DRAWINGS

FIG. 3 shows an example of vehicle state data.

DESCRIPTION OF EMBODIMENTS

Hereinafter, embodiments of the present invention will be described with reference to the accompanying drawings.

1. First Embodiment

<1-1. Outline>

Figure 1:
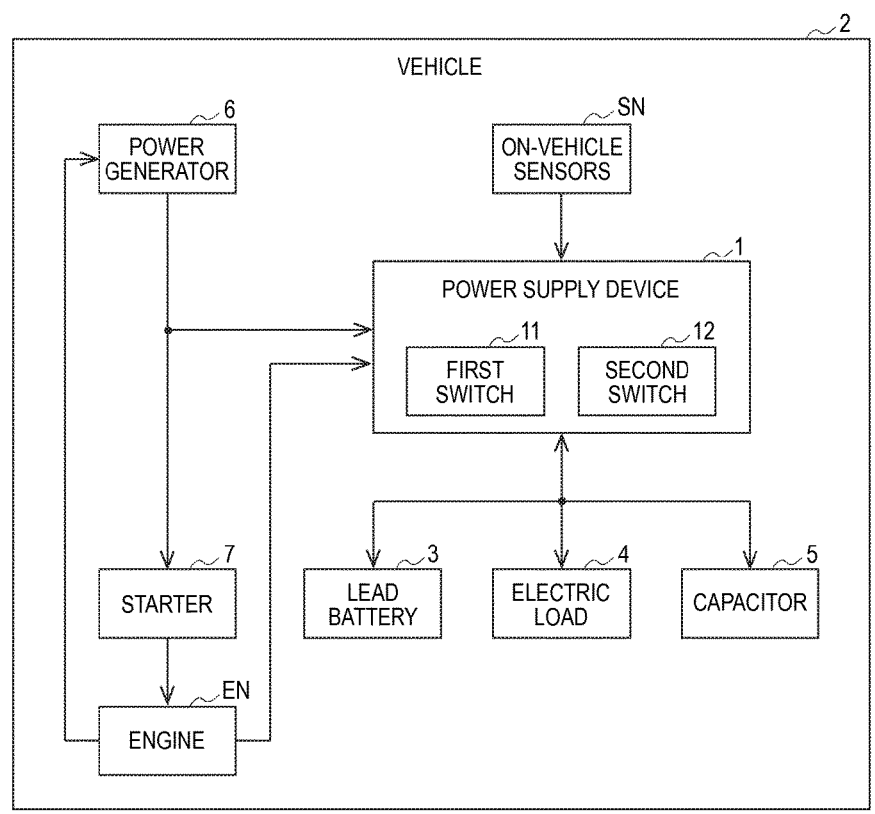
FIG. 1 shows the outline of a power supply device for a vehicle according to a first embodiment.

FIG. 1 shows the outline of a power supply device 1 for a vehicle according to a first embodiment. The power supply device 1 for a vehicle is an electronic control device, which is provided in a vehicle 2 and controls a lead battery 3, an electric load 4, and a capacitor 5 provided in the vehicle 2. The power supply device 1 for a vehicle appropriately distributes electric power from a power generator 6 provided in the vehicle 2 to the lead battery 3, the electric load 4, the capacitor 5, and an engine EN. As a result, it is possible to stably operate the electric load 4, without excessively lowering the charged states of the lead battery 3 and the capacitor 5, and it is possible to efficiently charge the lead battery 3 and the capacitor 5. Also, it is possible to smoothly start the engine EN.

For example, the power supply device 1 for a vehicle determines the state of the vehicle 2 such as a running state on the basis of signals from the engine EN and on-vehicle sensors SN, and performs appropriate power supply control according to the state of the vehicle 2. In other words, when the vehicle 2 returns from idling stop, the power supply device 1 controls a first switch 11 and a second switch 12 such that electric power of the capacitor 5 is supplied to a starter 7, thereby suppressing frequent discharging of the lead battery 3 and preventing deterioration of the lead battery 3.

Also, the engine EN is an internal combustion engine which is started by the starter 7. Also, the on-vehicle sensors SN are a vehicle speed sensor for detecting the speed of the vehicle, a receiver for receiving a signal for determining the state of the engine from an engine control device or an idling stop control device, and the like.

In some of the drawings, the switches, a DC to DC converter, the lead battery, a current which is supplied to the electric load 4, the capacitor 5, the power generator 6, and the charged state of the lead battery 3 or the capacitor 5 are referred to simply as "SW", "DDC", "Pb", "ELi", "Cap", "Alt", and "SOC", respectively.

<1-2. Configuration>

Figure 2:
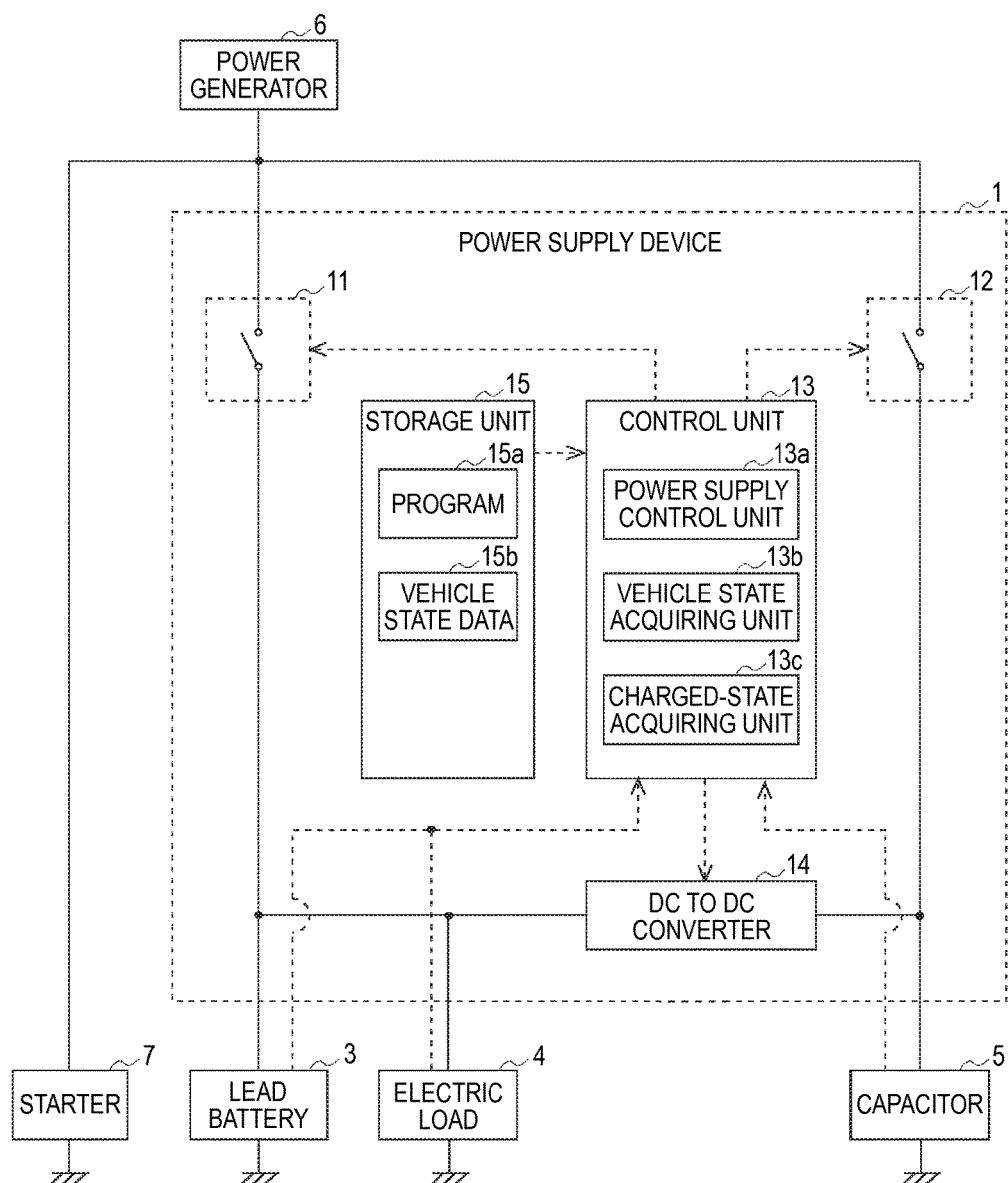
FIG. 2 shows the configuration of the power supply device for a vehicle according to the first embodiment.

FIG. 2 shows the configuration of the power supply device 1 for a vehicle. The power supply device 1 for a vehicle is connected to the lead battery 3, the electric load 4, the capacitor 5, the power generator 6, and the starter 7.

The lead battery 3 is a secondary battery having lead electrodes. The lead battery 3 acts as a main power supply for electric devices provided in the vehicle 2.

The electric load 4 is an electric device provided in the vehicle 2. Examples of the electric load 4 include a navigation device, a stereo system, an air conditioner, a light, a power steering system, a power window system, or the like. The amount of current consumption of the electric load 4 depends on its operation state. In a case where the amount of current consumption is large, the electric load 4 consumes current of 150 A or more.

The capacitor 5 is a storage battery for storing electric charge. For example, the capacitor 5 is a condenser; however, it needs only to be a rechargeable battery. The capacitor 5 acts as an auxiliary power supply of the lead battery 3. Also, after final stop of the engine EN (not shown), the capacitor 5 releases stored electric charge in order to prevent deterioration. Final stop of the engine EN is stop of the engine EN according to an operation on a key or a button when a driver gets off the vehicle. Therefore, final stop of the engine EN is different from temporal idling stop to be followed by restarting.

The power generator 6 is a device for generating electric power by using revolution of the engine EN as a driving source. Also, during decelerating of the vehicle 2, the power generator 6 generates regenerative electric power according to regenerative braking. The power generator 6 is also referred to as an alternator or a generator.

The starter 7 is a starting device which includes an electric motor and starts the engine EN.

The power supply device 1 for a vehicle includes the first switch 11, the second switch 12, a control unit 13, a DC to DC converter 14, and a storage unit 15.

The first switch 11 and the second switch 12 are switches (relays) for controlling breaking or opening of a circuit. For example, the first switch 11 and the second switch 12 are bipolar transistors or field effect transistors (FETs), particularly, metal-oxide-silicon field-effect transistors (MOSFETs). The first switch 11 is connected between the lead battery 3 and the power generator 6 and between the lead battery 3 and the starter 7. The second switch 12 is connected between the capacitor 5 and the power generator 6 and between the capacitor 5 and the starter 7. One end of the first switch 11 is connected to one end of the second switch 12, and the first and second switches are switched by the control unit 13 to be described below. Also, the first switch 11 acts as a first switch unit, and the second switch 12 acts as a second switch unit.

The control unit 13 is a micro computer including a CPU, a RAM, and a ROM. The control unit 13 controls the whole of the power supply device 1 for a vehicle. The control unit 13 includes a power supply control unit 13a, a vehicle state acquiring unit 13b, and a charged-state acquiring unit 13c. Also, the control unit 13 acts as a control unit for controlling the connection state of the first switch 11 and the connection state of the second switch 12.

The power supply control unit 13a controls the switching states of the first switch 11 and the second switch 12 and the driving state of the DC to DC converter 14 with reference to the charged states of the lead battery 3 and the capacitor 5, the current consumption of the electric load 4, the state of the vehicle 2, and the like.

The vehicle state acquiring unit 13b acquires information on the state of the vehicle 2 from the on-vehicle sensors SN (not shown). The state of the vehicle 2 is the running state of the vehicle 2 and the driving state of the engine EN. The running state of the vehicle 2 is the state of the vehicle 2 such as running or decelerating. The vehicle state acquiring unit 13b determines the state of the vehicle 2 such as running or decelerating on the basis of a signal output from the vehicle speed sensor. The driving state of the engine EN is first starting of the engine EN, restarting (returning) from idling stop, or the like. First starting of the engine EN is first starting of the engine EN which is performed in response to an operation on a key or a button after a driver gets in the vehicle 2. Restarting (returning) from idling stop is restarting of the engine EN which is performed if the driver operates the accelerator after temporal stop (idling stop) of the engine EN, for example, for waiting at a red light.

The charged-state acquiring unit 13c acquires information on the charged states of the lead battery 3 and the capacitor 5. Also, the charged-state acquiring unit 13c acts as an acquiring unit.

The DC to DC converter 14 is a DC transducer for converting a direct-current (DC) voltage (current) into another direct-current (DC) voltage (current). Also, the DC to DC converter 14 is a transformer for decreasing or increasing a DC voltage. The DC to DC converter 14 is connected between the lead battery 3 and the capacitor 5 and between the electric load 4 and the capacitor 5. Also, one end of the DC to DC converter 14 is connected to the first switch 11, and the other end thereof is connected to the second switch 12.

The storage unit 15 is a storage medium for storing data. For example, the storage unit 15 is a non-volatile memory such as an electrical erasable programmable read-only memory (EEPROM), a flash memory, or a hard disk drive having a magnetic disk. The storage unit 15 stores programs 15a and vehicle state data 15b.

The programs 15a are firmware which the control unit 13 reads and executes for controlling the power supply device 1 for a vehicle.

The vehicle state data 15b is a matrix-like data table including data items "VEHICLE STATE", "SWITCHING STATE OF FIRST SWITCH", "SWITCHING STATE OF SECOND SWITCH", "DRIVING STATE OF DC TO DC CONVERTER", AND "CONTROL STATE OF POWER SUPPLY DEVICE FOR VEHICLE". The vehicle state data 15b is referred to when the power supply control unit 13a controls the first switch 11, the second switch 12, and the DC to DC converter 14.

FIG. 3 shows an example of the vehicle state data 15b. The vehicle state data 15b includes a data item "VEHICLE STATE" MS, a data item "SWITCHING STATE OF FIRST SWITCH" FS, a data item "SWITCHING STATE OF SECOND SWITCH" SS, a data item "DRIVING STATE OF DC TO DC CONVERTER" DC, a data item "CONTROL STATE OF POWER SUPPLY DEVICE FOR VEHICLE" CS, and records R corresponding to those data items. Each data item corresponds to eight records.

In the data item "VEHICLE STATE" MS, the state of the vehicle 2 such as first starting of the engine EN or first charging of the capacitor 5 is input. In the data item "SWITCHING STATE OF FIRST SWITCH" FS and the data item "SWITCHING STATE OF SECOND SWITCH" SS, "ON" or "OFF" is input as the switching state of the first switch or the second switch. In the data item "DRIVING STATE OF DC TO DC CONVERTER" DC, "STOPPED" or "DRIVEN" is input as the driving state of the DC to DC converter. In the data item "CONTROL STATE OF POWER SUPPLY DEVICE FOR VEHICLE" CS, for example, control state information representing that electric power of the lead battery 3 is directly supplied to the starter 7 is input as the control state of the power supply device 1 for a vehicle. The data item "CONTROL STATE OF POWER SUPPLY DEVICE FOR VEHICLE" CS represents the control state of the power supply device 1 for a vehicle which is obtained if the first switch 11, the second switch 12, and the DC to DC converter 14 are controlled such that they become the states represented by the data item "SWITCHING STATE OF FIRST SWITCH" FS, the data item "SWITCHING STATE OF SECOND SWITCH" SS, and the data item "DRIVING STATE OF DC TO DC CONVERTER" DC when the vehicle 2 is in the state represented by the data item "VEHICLE STATE" MS.

Figure 4:
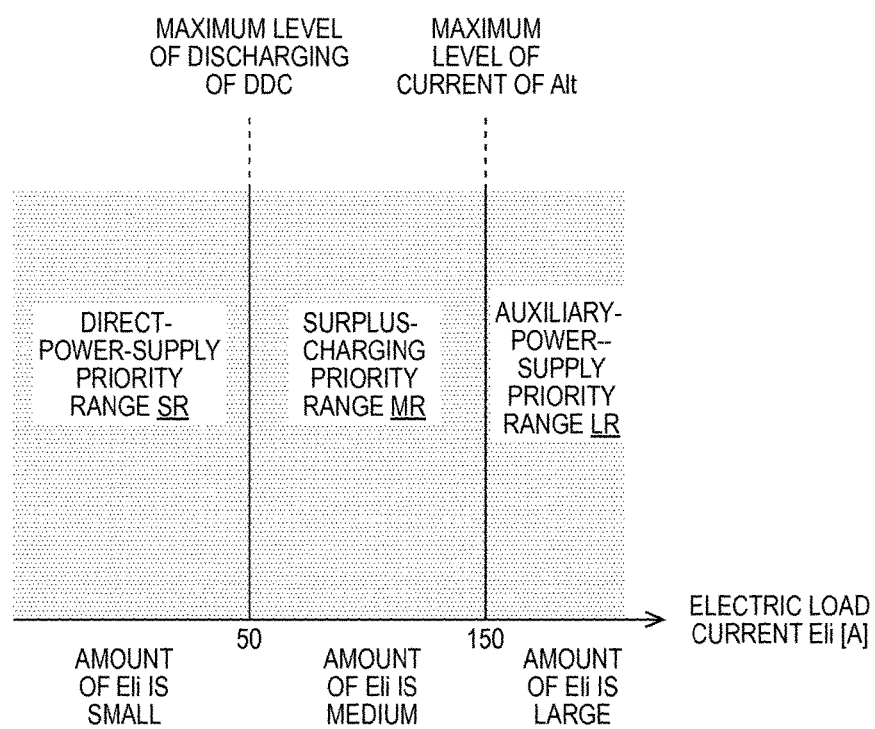
FIG. 4 shows the levels of currents which can be supplied to an electric load.

FIG. 4 shows the level of an electric load currents ELi which is supplied to the electric load 4. Also, the maximum current which the DC to DC converter 14 can output is 50 A and is referred to as the maximum discharging level of the DC to DC converter. The maximum current which the power generator 6 can output is 150 A and is referred to as the maximum current level of the power generator 6.

In a case where the electric load current ELi is a small amount of current whose level is equal to or lower than the maximum discharging level of the DC to DC converter, the electric load current ELi is included in a direct-power-supply priority range SR. In the case where the electric load current ELi is included in the direct-power-supply priority range SR, the power supply device 1 for a vehicle directly charges the capacitor 5 with the electric power of the power generator 6, and supplies electric power to the electric load 4 through the DC to DC converter 14. The reason is that since the electric load current ELi is a relatively small amount of current, it is possible to charge the capacitor 5 with the electric power of the power generator 6 and supply electric power to the electric load 4.

In a case where the electric load current ELi is a medium amount of current higher than the maximum discharging level of the DC to DC converter and equal to or lower than the maximum current level of the power generator 6, the electric load current ELi is included in an surplus-charging priority range MR. In the case where the electric load current ELi is included in the surplus-charging priority range MR, the power supply device 1 for a vehicle directly supplies the power of the power generator 6 to the electric load 4, and charges the capacitor 5 through the DC to DC converter 14. One of the reasons is that since the level of the electric load current ELi is medium, it is possible to supply the electric power of the power generator 6 directly to the electric load 4, beyond the output capability of the DC to DC converter 14. Another reason of the reasons is that since the level of the electric load current ELi is medium, it is possible to charge the capacitor 5 with the electric power of the power generator 6 through the DC to DC converter 14.

In a case where the electric load current ELi is a large amount of current whose level is higher than the maximum current level of the power generator 6, the electric load current ELi is included in an auxiliary-power-supply priority range LR. In the case where the electric load current ELi is included in the auxiliary-power-supply priority range LR, the power supply device 1 for a vehicle supplies the whole of the electric power of the power generator 6 directly to the electric load 4. Further, the power supply device 1 supplies the electric power of the lead battery 3 to the electric load 4. The reason is that since the electric load current ELi is a large amount of current, it is required to supply the electric power of the power generator 6 and the lead battery 3 to the electric load 4.

<1-3. Processes>

Figure 5:
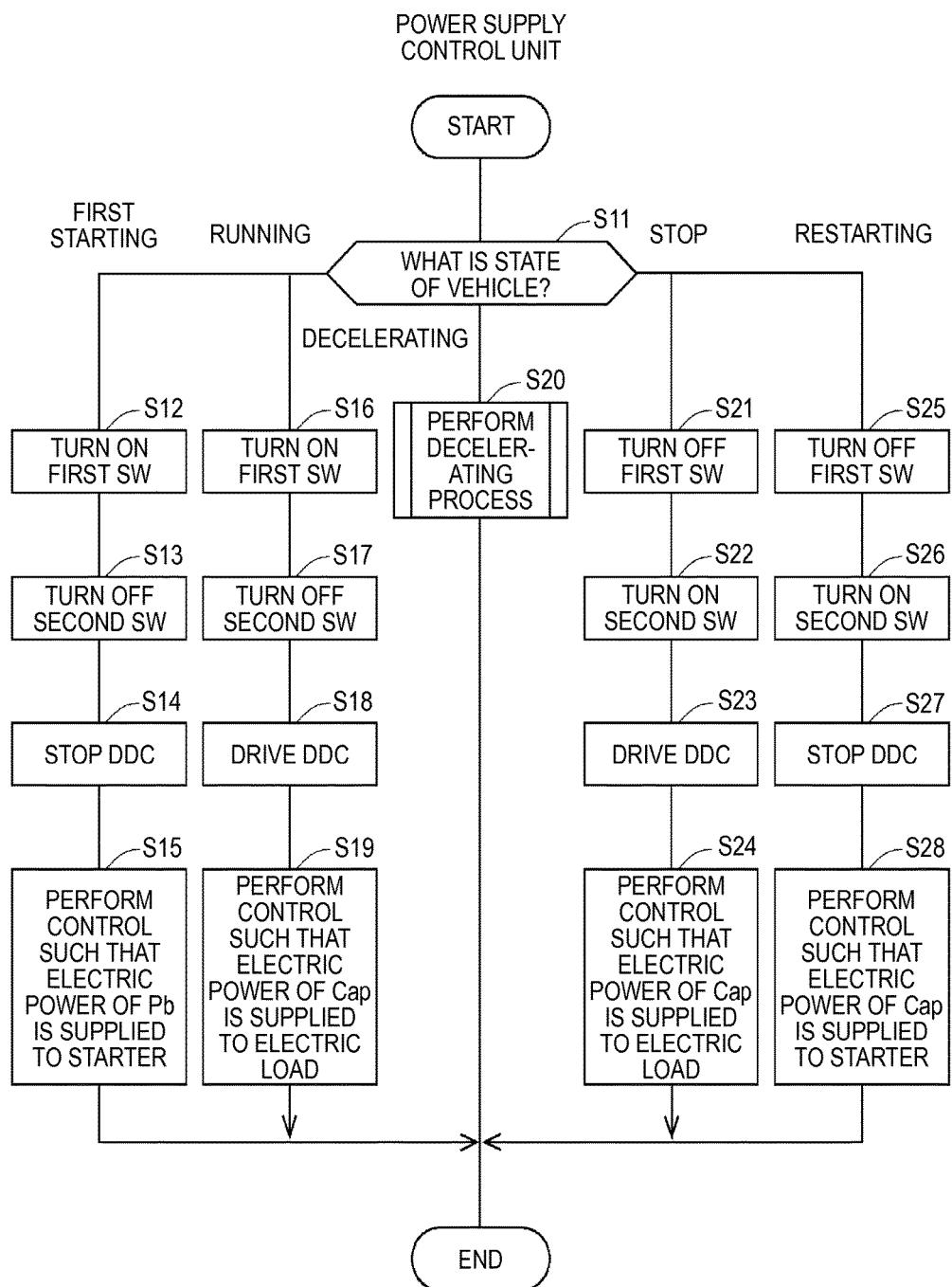
FIG. 5 shows a process of the power supply device for a vehicle according to the first embodiment.

FIG. 5 shows the procedure of a process of the power supply device 1 for a vehicle. The process shown in FIG. 5 is repeatedly performed in a predetermined cycle.

First, in STEP S11, the vehicle state acquiring unit 13b determines the state of the vehicle 2. On the basis of signals which are transmitted from the on-vehicle sensors SN, the vehicle state acquiring unit 13b determines the state of the vehicle 2. The state of the vehicle is any one of first starting of the engine EN, running of the vehicle 2, decelerating of the vehicle 2, stop of the vehicle 2, and restarting of the engine EN from temporal stop. Also, temporal stop is idling stop of the engine EN.

If the vehicle state acquiring unit 13b determines that the state of the vehicle 2 is first starting of the engine EN ("FIRST STARTING" in STEP S11), with reference to the vehicle state data 15b, the power supply control unit 13a turns on the first switch 11 in STEP S12, and turns off the second switch in STEP S13, and stops the DC to DC converter in STEP S14. Also, the vehicle state acquiring unit 13b determines whether the first starting of the engine EN has been caused by a signal from the engine control device. As a result, in STEP S15, the power supply device 1 for a vehicle supplies the electric power of the lead battery 3 to the starter 7 through the first switch 11. Also, since electric power is supplied from the lead battery 3 to the starter 7, even if charging of the capacitor 5 is insufficient, it is possible to start the engine EN. In order to prevent deterioration of the capacitor 5, releasing of electric charge from the capacitor 5 is performed after stop of the engine EN (which is, for example, stop caused by turning off an ignition key, not idling stop). For this reason, during first starting of the engine EN, charging of the capacitor 5 may insufficient.

If the vehicle state acquiring unit 13b determines that the state of the vehicle 2 is running ("RUNNING" in STEP S11), with reference to the vehicle state data 15b, the power supply control unit 13a turns on the first switch 11 in STEP S16, and turns off the second switch in STEP S17. Also, the power supply control unit 13a drives the DC to DC converter in STEP S18, and supplies the electric power of the capacitor 5 to the electric load 4 in STEP S19. Further, the vehicle state acquiring unit 13b determines whether the running of the vehicle 2 has been caused by a signal from the vehicle speed sensor for detecting the speed of the vehicle 2. As a result, during the running of the vehicle 2, it is possible to supply stable electric power to the electric load 4 through the DC to DC converter 14. That is, it is possible to stably operate devices, such as a navigation device, a stereo system, and an air conditioner, provided in the vehicle 2. Since the electric power of the capacitor 5 is used, it is possible to suppress discharging of the lead battery and prevent deterioration thereof.

If the vehicle state acquiring unit 13b determines that the state of the vehicle 2 is decelerating ("DECELERATING" in STEP S11), in STEP S20, the power supply control unit 13a performs a decelerating process. The process content which is performed in the decelerating process will be described below. Also, the vehicle state acquiring unit 13b determines whether the decelerating of the vehicle 2 has been caused by a signal from the vehicle speed sensor for detecting the speed of the vehicle 2.

If the vehicle state acquiring unit 13b determines that the vehicle 2 is at a stop, that is, an idling stop ("STOP" in STEP S11), with reference to the vehicle state data 15b, the power supply control unit 13a turns off the first switch 11 in STEP S21, and turns on the second switch in STEP S22, and drives the DC to DC converter 14 in STEP S23, thereby supplying the electric power of the capacitor 5 to the electric load 4 in STEP S24. As a result, during the stop of the vehicle 2, it is possible to supply stable electric power to the electric load 4 through the DC to DC converter 14. Also, since the electric power of the capacitor 5 is used, it is possible to suppress discharging of the lead battery. Further, the power supply control unit 13a determines whether the stop of the vehicle 2 has been caused by a signal from the idling stop control device.

If the vehicle state acquiring unit 13b determines that the state of the vehicle 2 is restarting from a temporal stop state, that is, returning from idling stop ("RESTARTING" in STEP S11), with reference to the vehicle state data 15b, the power supply control unit 13a turns off the first switch 11 in STEP S25, and turns on the second switch in STEP S26, and stops the DC to DC converter 14 in STEP S27, thereby supplying the electric power of the capacitor 5 to the starter 7 through the second switch 12 in STEP S28. Since the electric power of the capacitor 5 is used to perform frequent restarting, it is possible to suppress the frequency of use of the lead battery 3. If the frequency of use of the lead battery 3 is suppressed, it is possible to prevent deterioration of the lead battery 3. Also, since the DC to DC converter 14 is stopped, it is possible to supply most of the electric power of the capacitor 5 to the starter 7 consuming a large amount of electric power, without distributing the electric power of the capacitor 5 to the electric load 4. Further, the vehicle state acquiring unit 13b determines whether the restarting of the vehicle 2 from the temporal stop state has been caused by a signal from the idling stop control device.

Figure 6:
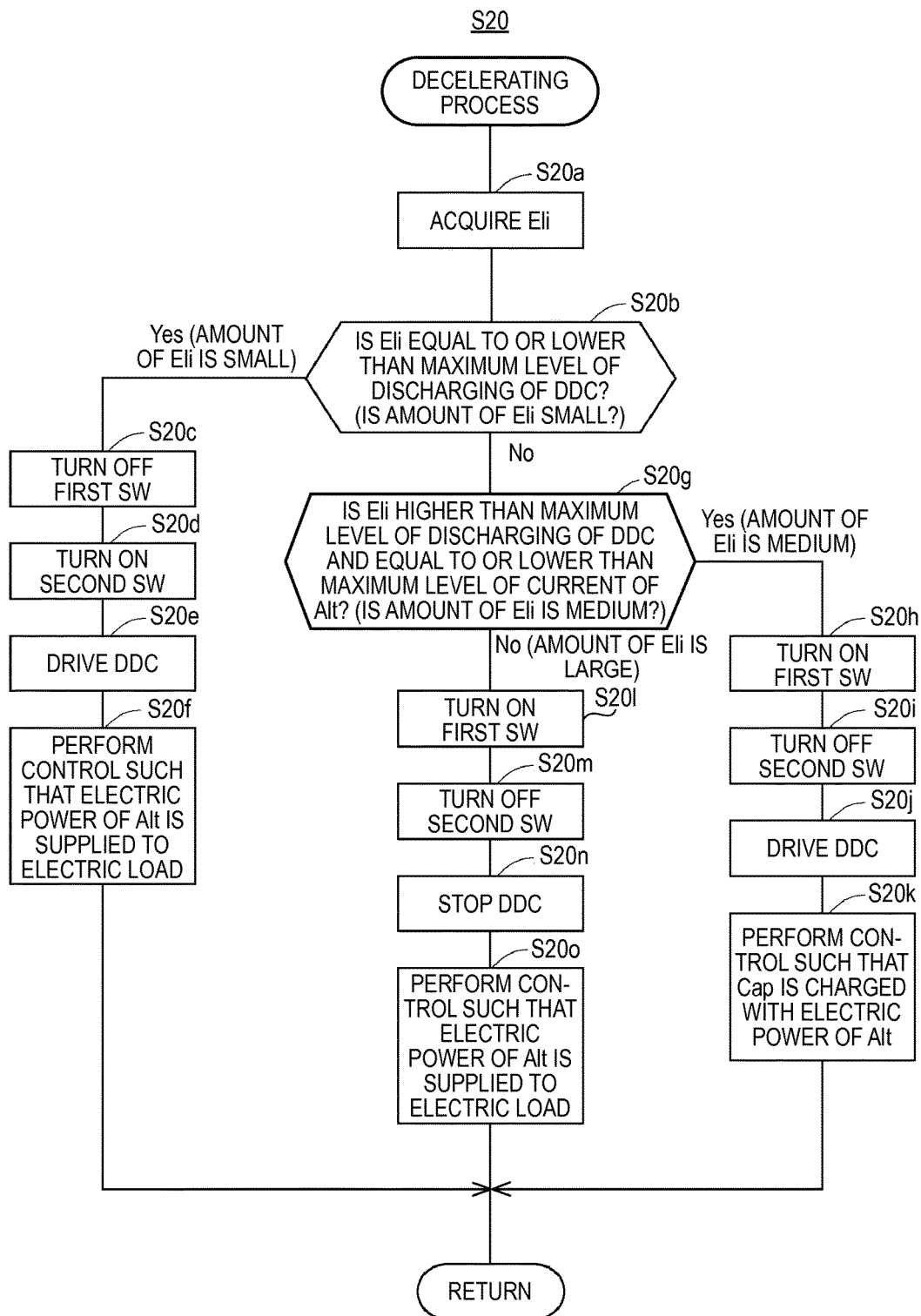
FIG. 6 shows another process of the power supply device for a vehicle according to the first embodiment.

FIG. 6 shows the process content of the decelerating process of STEP S20. If the decelerating process starts, in STEP S20a, the charged-state acquiring unit 13c acquires information on a current which is supplied to the electric load 4, that is, the consumption current ELi of the electric load 4.

In STEP S20b, the charged-state acquiring unit 13c determines whether the consumption current ELi is equal to or lower than the maximum discharging level of the DC to DC converter, that is, the consumption current ELi is a small amount of current equal to or lower than 50 A, and is included in the direct-power-supply priority range SR.

If the charged-state acquiring unit 13c determines that the consumption current ELi is equal to or lower than the maximum discharging level of the DC to DC converter ("Yes" in STEP S20b), with reference to the vehicle state data 15b, the power supply control unit 13a turns off the first switch 11 in STEP S20c, and turns on the second switch in STEP S20d, and drives the DC to DC converter 14 in STEP S20e, thereby charging the capacitor 5 with the regenerative electric power of the power generator 6 attributable to the decelerating of the vehicle 2 while supplying electric power to the electric load 4 through the DC to DC converter 14 in STEP S20f. In this way, it is possible to charge the capacitor 5 with the regenerative electric power of the power generator 6 and it is possible to supply stable electric power to the electric load 4 through the DC to DC converter 14.

Meanwhile, if the charged-state acquiring unit 13c determines that the consumption current ELi is higher than the maximum discharging level of the DC to DC converter ("No" in STEP S20b), in STEP S20g, the charged-state acquiring unit 13c determines whether the consumption current ELi is higher than the maximum discharging level of the DC to DC converter 14 and is equal to or lower than the maximum current level of the power generator 6, that is, the consumption current ELi is a medium amount of current higher than 50 A and lower than 150 A, and is included in the surplus-charging priority range MR.

If the charged-state acquiring unit 13c determines that the consumption current ELi is higher than the maximum discharging level of the DC to DC converter 14 and is equal to or lower than the maximum current level of the power generator 6 ("Yes" in STEP S20g), with reference to the vehicle state data 15b, the power supply control unit 13a turns on the first switch 11 in STEP S20h, and turns off the second switch in STEP S20i, and drives the DC to DC converter 14 in STEP S20j, thereby supplying the regenerative electric power of the power generator 6 attributable to the decelerating of the vehicle 2 directly to the electric load 4 while charging the capacitor 5 through the DC to DC converter 14 in STEP S20k. The reason why the regenerative electric power of the power generator 6 is supplied directly to the electric load 4 without passing through the DC to DC converter 14 is that the electric load 4 requires a large amount of current exceeding the output capability of the DC to DC converter 14. In the above described manner, it is possible to supply the regenerative electric power of the power generator 6 directly to the electric load 4 requiring a large amount of current, and it is possible to charge the capacitor 5 with stable electric power through the DC to DC converter 14.

Meanwhile, if the charged-state acquiring unit 13c determines that the consumption current ELi is higher than the maximum discharging level of the DC to DC converter 14 and is higher than the maximum current level of the power generator 6 ("No" in STEP S20g), the charged-state acquiring unit 13c determines the consumption current ELi is a large amount of current higher than 150 A and is included in the auxiliary-power-supply priority range LR.

If the charged-state acquiring unit 13c determines that the consumption current ELi is higher than the maximum current level, with reference to the vehicle state data 15b, the power supply control unit 13a turns on the first switch 11 in STEP S20l, and turns off the second switch in STEP S20m, and stops the DC to DC converter 14 in STEP S20n, thereby supplying the regenerative electric power of the power generator 6 attributable to the decelerating of the vehicle 2 directly to the electric load 4 while supplying the electric power of the capacitor 5 to the electric load 4 through the DC to DC converter 14 in STEP S20o. In this way, it is possible to supply the regenerative electric power of the power generator 6 directly to the electric load 4 requiring a very large amount of current while it is possible to charge the electric load 4 with stable electric power through the DC to DC converter 14. Therefore, even in a case where the electric load 4 requires a very large amount of current, it is possible to stably operate the electric load 4. Also, the case where the electric load 4 requires a very large amount of current is a case where various electric devices such as an air conditioner and a light operate at the same time.

As described above, during decelerating of the vehicle 2, the regenerative electric power of the power generator 6 is used. Therefore, it is possible to effectively use energy attributable to decelerating of the vehicle 2. Also, in a case where the electric load 4 requires a small amount of current, it is possible to supply the regenerative electric power of the power generator 6 to the electric load 4 while charging the capacitor 5, whereby it is possible to prevent insufficiency in charging of the capacitor 5. Also, in a case where the electric load 4 requires a large amount of current exceeding the output capability of the DC to DC converter 14, the regenerative electric power of the power generator 6 is supplied directly to the electric load 4, whereby it is possible to stably operate the electric load 4.

<1-4. Circuit Configuration>

Figure 7:
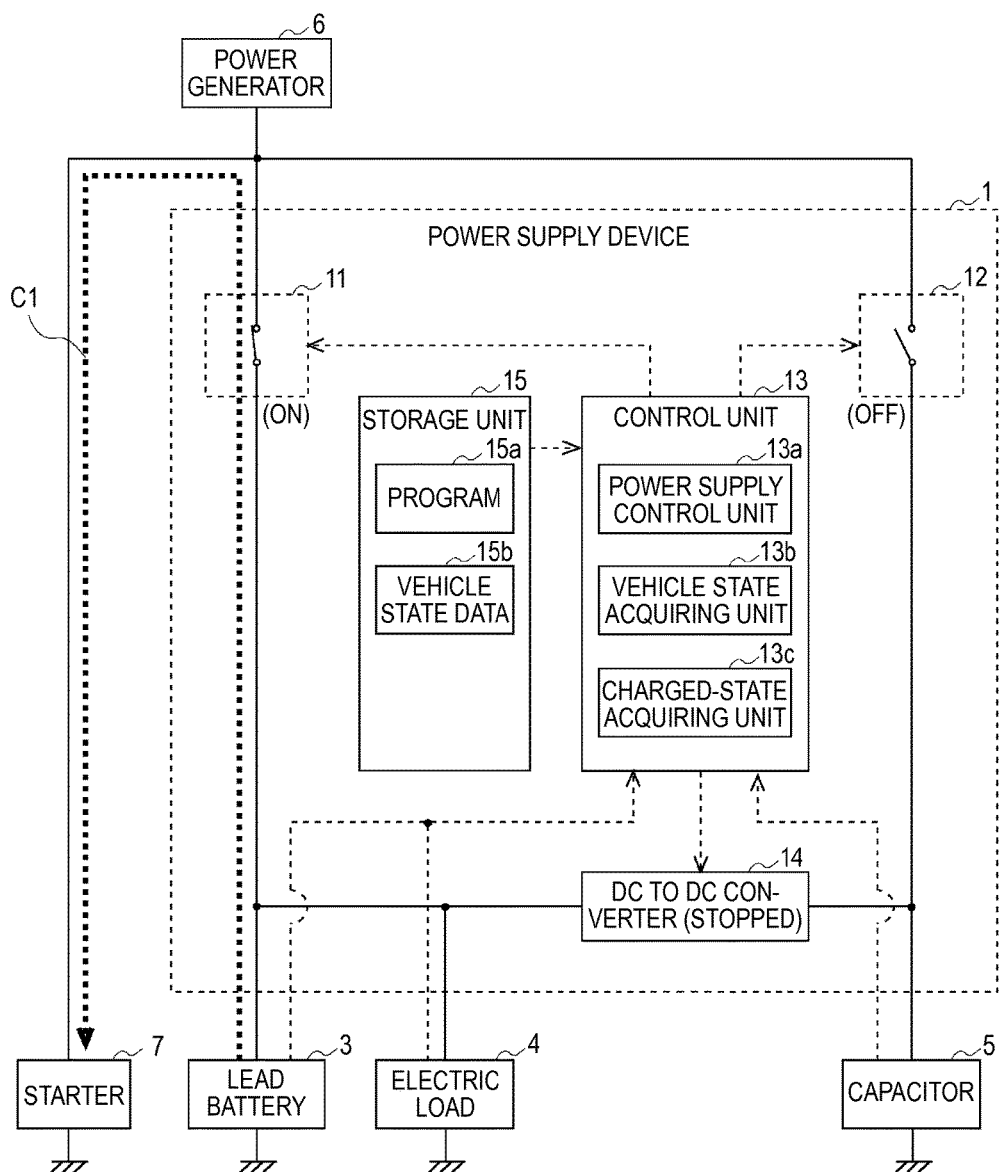
FIG. 7 shows the control states of switches and the transmission path of electric power.

FIG. 7 shows the circuit configuration of the power supply device 1 for a vehicle during first starting of the engine EN. In this case, the power supply device 1 for a vehicle turns on the first switch 11, and turns off the second switch 12, and stops the DC to DC converter 14. As a result, between the lead battery 3 and the starter 7, a path C1 is formed such that electric power can be supplied from the lead battery 3 directly to the starter 7 through the first switch 11. During first starting, since charging of the capacitor 5 is insufficient, electric power is supplied from the lead battery 3 directly to the starter 7, whereby it is possible to smoothly start the engine EN. The reason is that the capacitor 5 is discharged after final stop of the engine EN in order to prevent deterioration of the capacitor.

Figure 8:
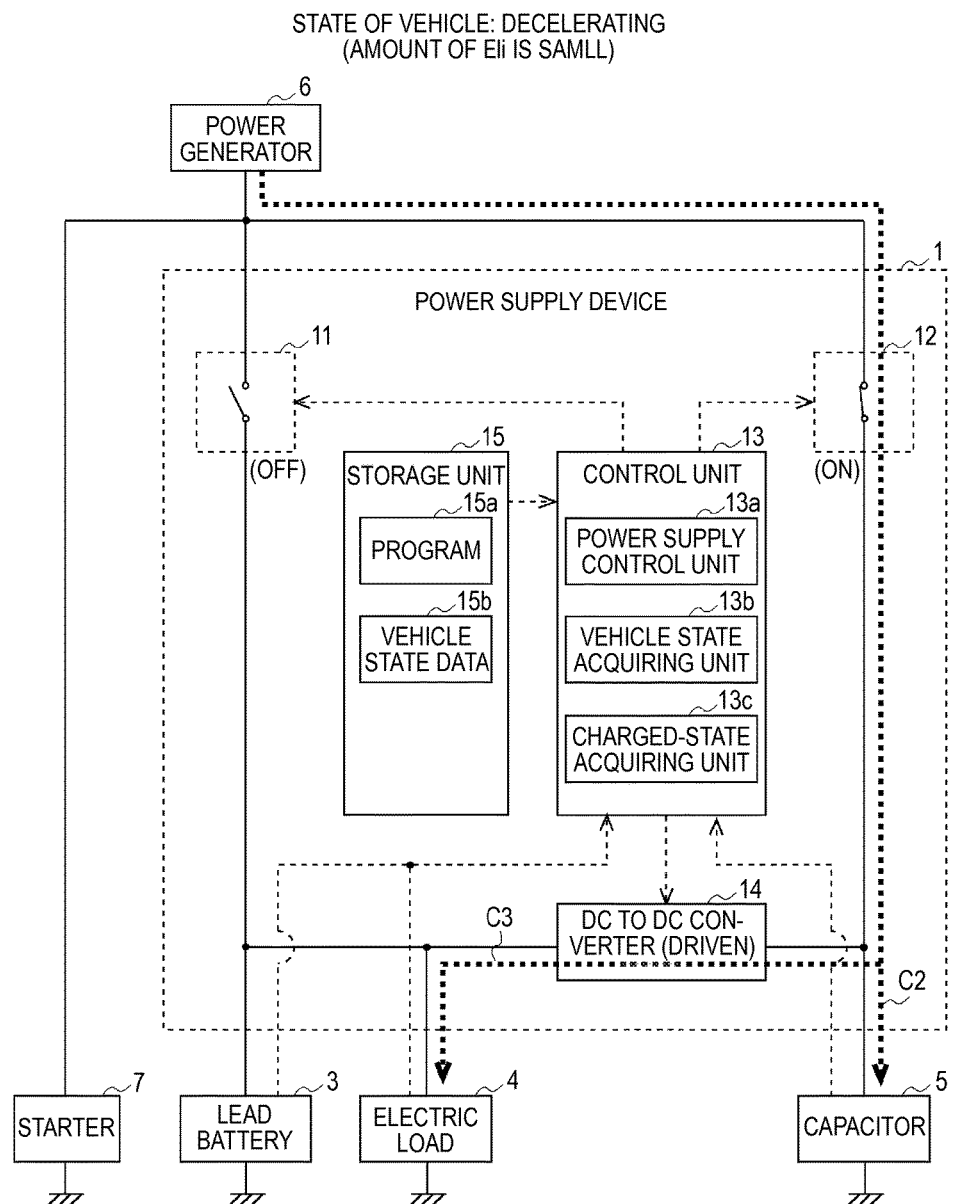
FIG. 8 shows the control states of the switches and the transmission path of electric power.

FIG. 8 shows the circuit configuration of the power supply device 1 for a vehicle in a case where the vehicle 2 decelerates and the amount of the current ELi which is supplied to the electric load is small. In this case, the power supply device 1 for a vehicle turns off the first switch 11, and turns on the second switch 12, and drives the DC to DC converter 14, thereby supplying the electric power of the power generator 6 to the electric load 4. In this case, between the power generator 6 and the capacitor 5, a path C2 is formed, and between the power generator 6 and the electric load 4, a path C3 is formed, such that it is possible to directly charge the capacitor 5 with the regenerative electric power of the power generator 6 and it is possible to supply a stable current to the electric load 4 through the DC to DC converter 14.

Figure 9:
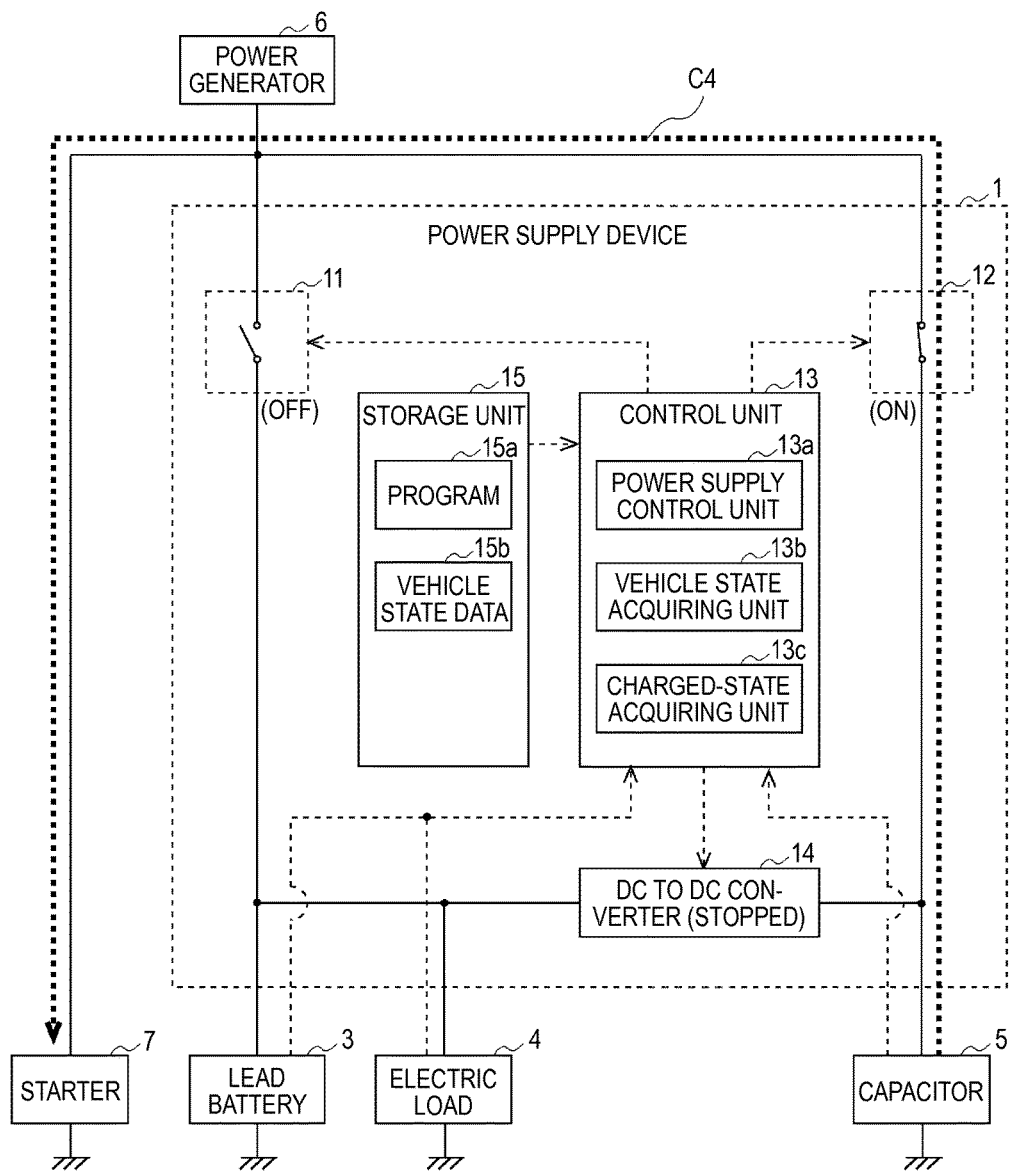
FIG. 9 shows the control states of the switches and the transmission path of electric power.

FIG. 9 shows the circuit configuration of the power supply device 1 for a vehicle in a case where the vehicle 2 restarts from idling stop. In this case, the power supply device 1 for a vehicle turns off the first switch 11, and turns on the second switch 12, and stops the DC to DC converter 14. As a result, between the capacitor 5 and the starter 7, a path C4 is formed such that it is possible to directly drive the starter 7 with the electric power of the capacitor 5. That is, during frequent restarting, since the electric power of lead battery 3 is not used, it is possible to prevent the lead battery 3 from being wasted and deteriorated.

<1-5. Configurations of Switches, Process on Switches, and Operations of Switches>

Subsequently, the configurations of the first switch 11 and the second switch 12, a process on the first and second switches, and operations of the first and second switches will be described. According to switching of the first switch 11 and the second switch 12, an overcurrent or a surge voltage may be generated, resulting in damage in the power supply device 1 for a vehicle.

That is, if the first switch 11 and the second switch 12 are turned on at the same time in a state where charging of the lead battery 3 (or the capacitor 5) is sufficient and charging of the capacitor 5 (or the lead battery 3) is insufficient, an overcurrent may flow from the sufficiently charged lead battery (or capacitor) to the insufficiently charged capacitor (or lead battery), resulting in ignition or heat. For this reason, during switching of the first switch 11 and the second switch 12, it is required control for preventing the first and second switches from being turned on at the same time.

Also, before the first switch 11 and the second switch 12 are turned on, both switches are turned off at the same time, whereby it is possible to prevent both switches from being turned on at the same time. However, if both switches are turned off at the same time, the discharging destination of the power generator 6 disappears. In this case, the power generator 6 becomes a so-called load dump state which is a high-voltage state. If any one of the first switch 11 and the second switch 12 is turned on after the power generator 6 becomes the load dump state, sudden generation of a high voltage, that is, a surge voltage may occur, resulting in damage in the power supply device 1 for a vehicle.

For this reason, the configurations of the first switch 11 and the second switch 12, the process on the first and second switches, and the operations of the first and second switches according to the present embodiment are for safely performing switching of both switches 11 and 12 without simultaneously turning on and off both switches 11 and 12, that is, without generating an overcurrent or a surge voltage.

Figure 10:
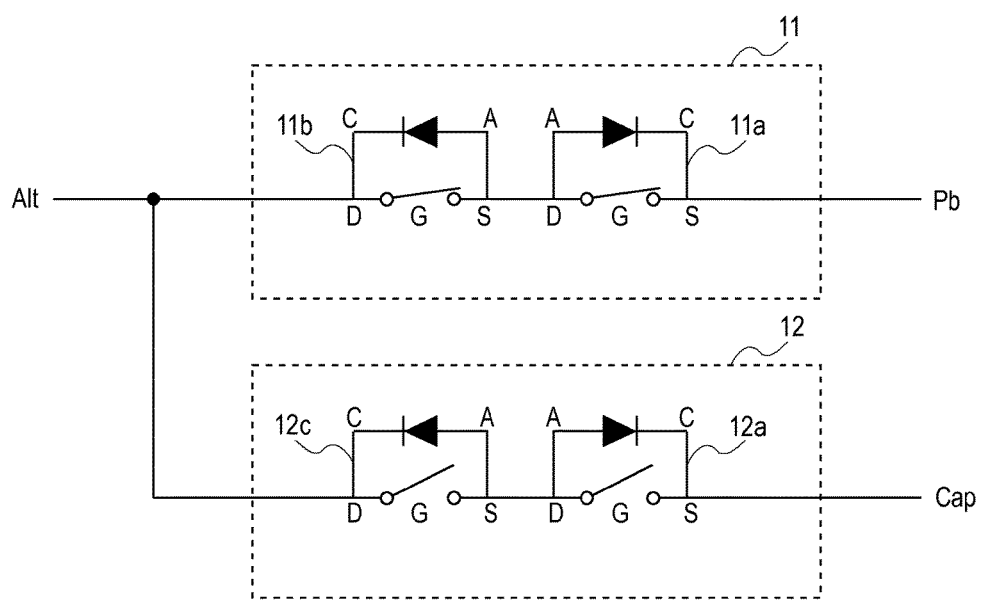
FIG. 10 shows the configurations of a first switch and a second switch.

FIG. 10 shows the internal configurations of the first switch 11 and the second switch 12. The first switch 11 is configured by connecting a first MOSFET 11a and a second MOSFET 11b. The source S of the first MOSFET 11a is connected to the power generator 6, and the drain D thereof is connected to the second MOSFET 11b. The anode A of a parasitic diode connecting the drain D and source S of the first MOSFET 11a is connected to the power generator 6, and the cathode C of the parasitic diode is connected to the lead battery 3. The cathode C of a parasitic diode connecting the drain D and source S of the second MOSFET 11b is connected to the power generator 6, and the anode A of the parasitic diode is connected to the lead battery 3. The gates G of the first MOSFET 11a and the second MOSFET 11b are controlled by the power supply control unit 13a.

The second switch 12 is configured by connecting a third MOSFET 12a and a fourth MOSFET 12b, and is the same as the first switch 11 in the other configuration. That is, the second switch 12 can be configured by replacing the first MOSFET 11a, the second MOSFET 11b, and the lead battery 3 of the configuration of the first switch 11 with the third MOSFET 12a, the fourth MOSFET 12b, and the capacitor 5.

Figure 11:
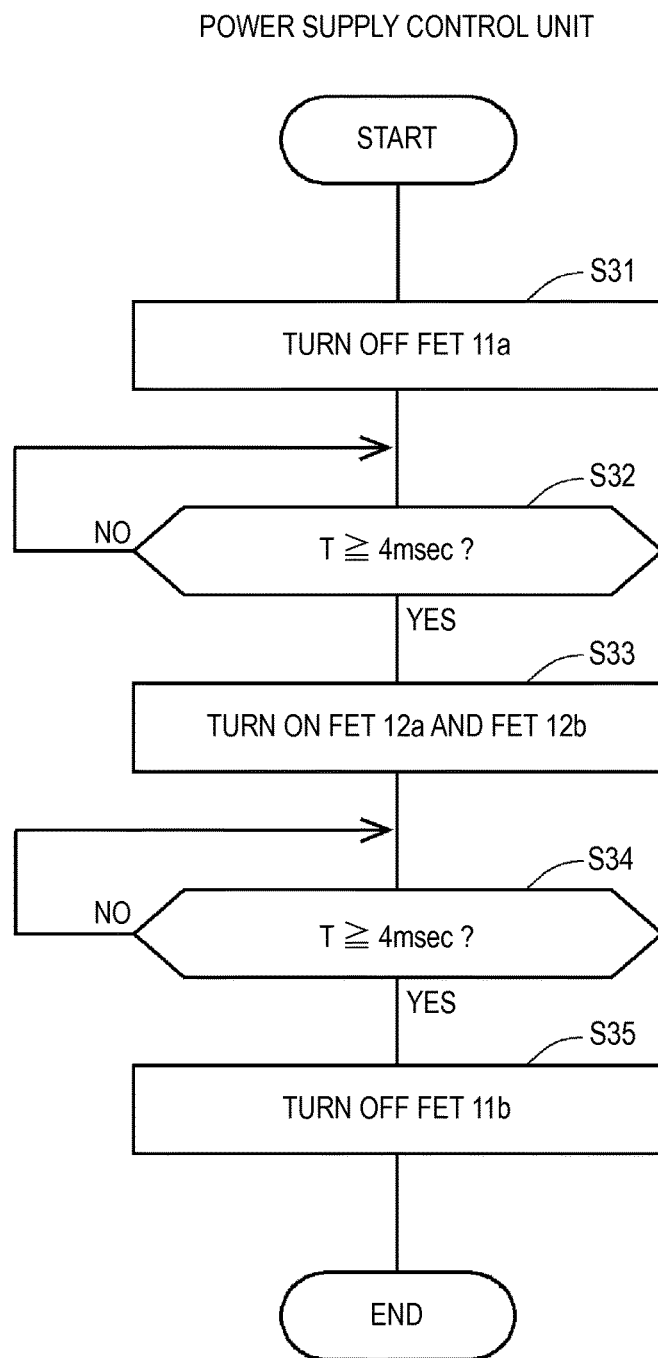
FIG. 11 shows a process on the first switch and the second switch.

FIG. 11 shows a switching process on the first switch 11 and the second switch 12. Particularly, FIG. 11 shows a switching process of switching the first switch 11 from the ON state to the OFF state and switching the second switch 12 from the OFF state to the ON state. Therefore, the process shown in FIG. 11 starts from a state where the first switch 11 is on and the second switch 12 is off. Also, this process is controlled by the power supply control unit 13a.

First, in STEP S31, the power supply control unit 13a turns on the first MOSFET 11a. In STEP S32, the power supply control unit 13a determines whether an elapsed time T has become 4 msec or more. 4 msec is a time sufficient for turning on or off a MOSFET while keeping the first MOSFET 11a off.

If the power supply control unit 13a determines that the elapsed time T has not become 4 msec or more ("No" in STEP S32), it waits without performing control on the MOSFETs, and refers to the elapsed time T again.

Meanwhile, if the power supply control unit 13a determines that the elapsed time T has become 4 msec or more ("Yes" in STEP S32), in STEP S33, the power supply control unit turns on the third MOSFET 12a and the fourth MOSFET 12b.

If the power supply control unit 13a turns on the third MOSFET 12a and the fourth MOSFET 12b, in STEP S34, the power supply control unit determines whether the elapsed time T has become 4 msec or more while keeping the third MOSFET 12a and fourth MOSFET 12b on.

If the power supply control unit 13a determines that the elapsed time T has not become 4 msec or more ("No" in STEP S34), it waits without performing control on the MOSFETs, and refers to the elapsed time T again.

Meanwhile, if the power supply control unit 13a determines that the elapsed time T has become 4 msec or more ("Yes" in STEP S32), in STEP S35, the power supply control unit turns off the second MOSFET 11b.

Also, the switching process of switching the first switch 11 from the OFF state to the ON state and switching the second switch 12 from the ON state to the OFF state may be performed on the first switch 11 and the second switch 12, reversely to the process shown in FIG. 11.

Figure 12:
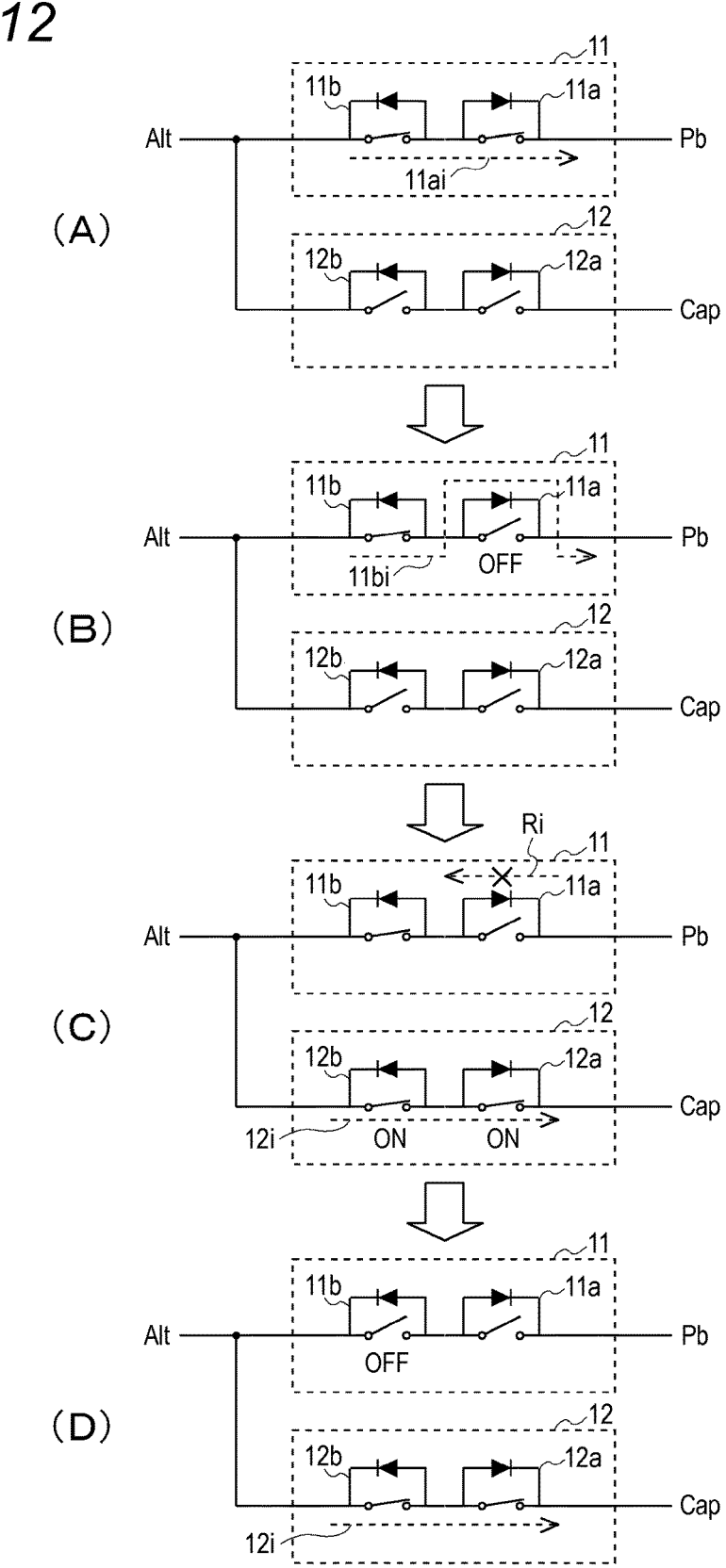
FIG. 12 shows operations of the first switch and the second switch.

FIG. 12 shows the switching operations of the first switch 11 and the second switch 12. Particularly, the switching operations of the MOSFETs in the process shown in FIG. 11, that is, in the switching process of switching the first switch 11 from the ON state to the OFF state and switching the second switch 12 from the OFF state to the ON state. Therefore, the process shown in FIG. 12 starts from a state (a state "A") where the first switch 11 is on and the second switch 12 is off. In the state "A", a current 11ai is supplied from the power generator 6 to the lead battery 3.

From the state "A", the first MOSFET 11a is turned off (a state "B"). In the state "B", a current 11bi is supplied to the parasitic diodes of the second MOSFET 11b and the first MOSFET 11a.

From the state "B", the third MOSFET 12a and the fourth MOSFET 12b are turned on (a state "C"). In the state "C", a current 12i is supplied from the power generator 6 to the capacitor 5 through the second switch 12. At this time, an overcurrent Ri may be supplied from the lead battery 3 charged sufficiently to the capacitor 5 charged insufficiently. However, the overcurrent Ri is interrupted by the parasitic diode of the first MOSFET 11a.

From the state "C", the second MOSFET 11b is turned off (a state "D"). The state "D" is a state where the first switch 11 and the second switch 12 have been switched between their ON states and their OFF states. In the state "D", since the second switch 12 is on, the current 12i is supplied from the power generator 6 to the capacitor 5.

Also, the switching process of switching the first switch 11 from the OFF state to the ON state and switching the second switch 12 from the ON state to the OFF state may be performed on the first switch 11 and the second switch 12, reversely to the process shown in FIG. 12.

As described above, since the first switch 11 and the second switch 12 are not simultaneously turned on and off, it is possible to safely perform switching of both switches 11 and 12 without generating an overcurrent or a surge voltage.

Also, since the cathodes of the parasitic diodes of the first switch 11 and the second switch 12 are directed to the lead battery 3 and the capacitor 5, it is possible to prevent a current from flowing from the lead battery 3 and the capacitor 5 back to the starter after changing of the lead battery 3 and the capacitor 5.

As described above, the power supply device 1 for a vehicle according to the present embodiment controls the connection states of the first switch 11 and the second switch 12 connected to the power generator 6, the lead battery 3, and the capacitor 5, according to the state of the vehicle 2. Therefore, when the engine EN starts for the first time, electric power is supplied from the lead battery 3 to the starter 7, whereby smooth starting is possible. Also, when the engine EN restarts from a temporal stop state, electric power is supplied from the capacitor 5 to the starter 7, whereby it is possible to suppress discharging of the lead battery 3, thereby preventing deterioration thereof.

Also, the regenerative electric power of the power generator 6 is accumulated in the capacitor 5, without passing through the DC to DC converter 14. Therefore, it is possible to suppress the power generator 6 from operating for charging the capacitor 5, resulting in an improvement in fuel efficiency. Also, it is possible to improve the fuel efficiency while preventing deterioration of the lead battery 3.

Also, since the charging routes to the lead battery 3 and the capacitor 5 are switched according to the amount of a current which is supplied to the electric load 4, it is possible to improve the fuel efficiency.

Also, since it is possible to control charging of the lead battery 3 and the capacitor 5 and driving of the starter 7 by only the power supply device 1 for a vehicle, it is possible to reduce the size and cost of the power supply device 1 for a vehicle.

2. Second Embodiment

Subsequently, a second embodiment will be described. The second embodiment includes components identical to those of the first embodiment. Therefore, differences from the first embodiment will be mainly described below.

<2-1. Configuration>

Figure 13:
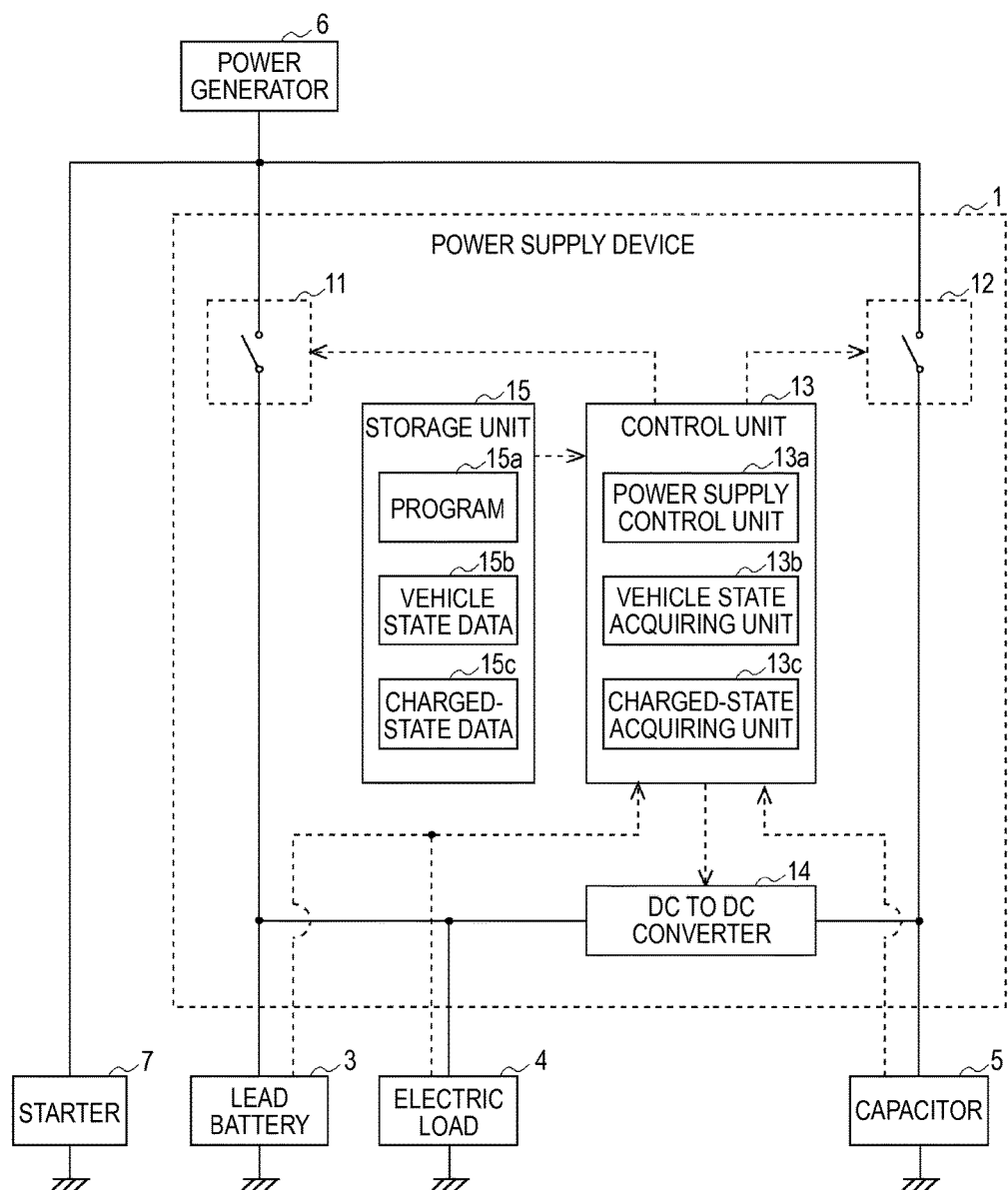
FIG. 13 shows the outline of a power supply device for a vehicle according to a second embodiment.

FIG. 13 shows the configuration of a power supply device 1 for a vehicle according to the second embodiment. As described above, the power supply device 1 for a vehicle according to the first embodiment stores the vehicle state data 15b in the storage unit 15. In contrast to this, the power supply device 1 for a vehicle according to the second embodiment stores not only the vehicle state data 15b but also charged-state data 15c in the storage unit 15.

The charged-state data 15c is a matrix-like data table including data items on the charged states of the lead battery 3 and the capacitor 5, the switching state of the first switch, the switching state of the second switch, the driving state of the DC to DC converter, and the control state of the power supply device for a vehicle.

Figures 14, 15:
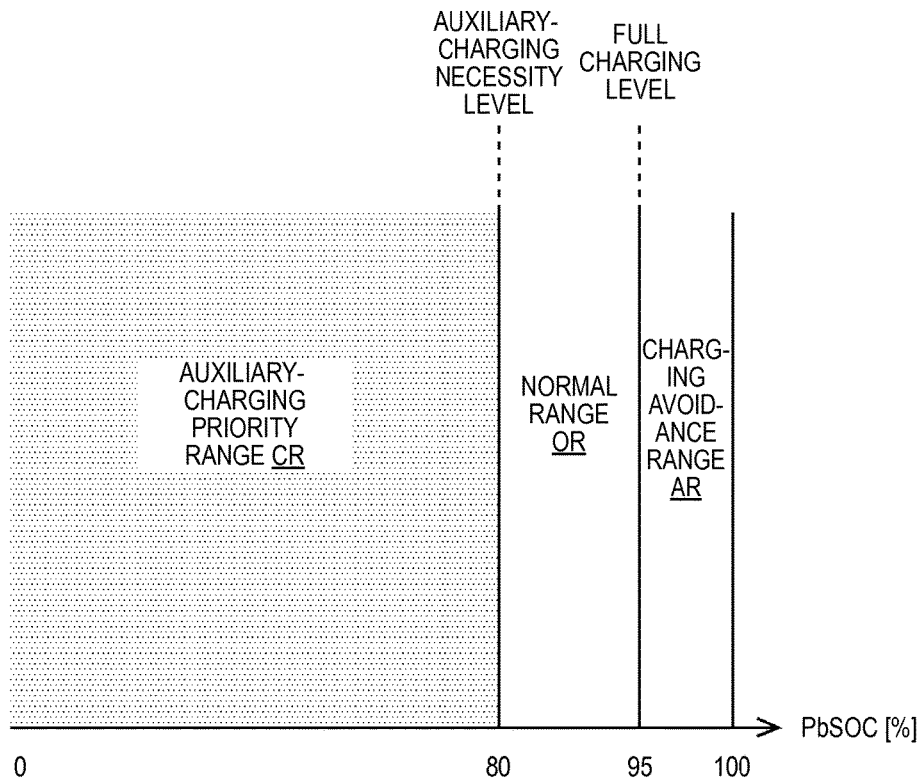
FIG. 14 shows an example of charged-state data.
FIG. 15 shows charged levels of a lead battery.

FIG. 14 shows an example of the charged-state data 15c. The charged-state data 15c includes a data item "CHARGED STATE" RS, a data item "SWITCHING STATE OF FIRST SWITCH" FS, a data item "SWITCHING STATE OF SECOND SWITCH" SS, a data item "DRIVING STATE OF DC TO DC CONVERTER" DC, and a data item "CONTROL STATE OF POWER SUPPLY DEVICE FOR VEHICLE" CS, and records R corresponding to those data items. Each data item corresponds to two records.

In the data item "CHARGED STATE" RS, the charged states of the lead battery 3 and the capacitor 5 are input. That is, the charged state of the lead battery is equal to or less than 80%, and the voltage of the capacitor is higher than a deterioration prevention level and is equal to or lower than a restarting securement level. In the other data items, similarly in the vehicle state data 15b described with reference to FIG. 3, data items corresponding to the data item "CHARGED STATE" RS are input.

FIG. 15 shows the level of the charged state PbSOC of the lead battery 3. Also, FIG. 15 shows 80% as an auxiliary-charging necessity level which is a charged-state level at which charging of the lead battery 3 is required. Further, FIG. 15 shows 95% as a full charging level which is a charged-state level corresponding to the full charge of the lead battery 3.

In a case where the charged state PbSOC of the lead battery 3 is equal to or lower than the auxiliary-charging necessity level, the charged state PbSOC is included in an auxiliary-charging priority range CR. In the case where the charged state PbSOC is included in the auxiliary-charging priority range CR, the power supply device 1 for a vehicle directly charges the lead battery 3 with the electric power of the power generator 6, and charges the capacitor 5 with surplus electric power through the DC to DC converter 14. In this way, it is possible to preferentially charge the lead battery 3. Also, in the case where the charged state PbSOC of the lead battery 3 is equal to or lower than the auxiliary-charging necessity level, the power supply device 1 for a vehicle charges the lead battery 3 in preference to the other control.

In a case where the charged state PbSOC of the lead battery 3 is higher than the auxiliary-charging necessity level and is equal to or lower than the full charging level, the charged state PbSOC is included in a normal range OR. In the case where the charged state PbSOC is included in the normal range OR, the power supply device 1 for a vehicle accumulates the electric power of the power generator 6 in the capacitor 5 and supplies the electric power of the power generator 6 to the electric load 4.

In a case where the charged state PbSOC of the lead battery 3 is higher than the full charging level, the charged state PbSOC is included in a charging avoidance range AR. In the case where the charged state PbSOC is included in the charging avoidance range AR, the power supply device 1 for a vehicle prohibits charging of the lead battery 3. This is for preventing the lead battery 3 from being unnecessarily charged, thereby being deteriorated.

Figure 16:
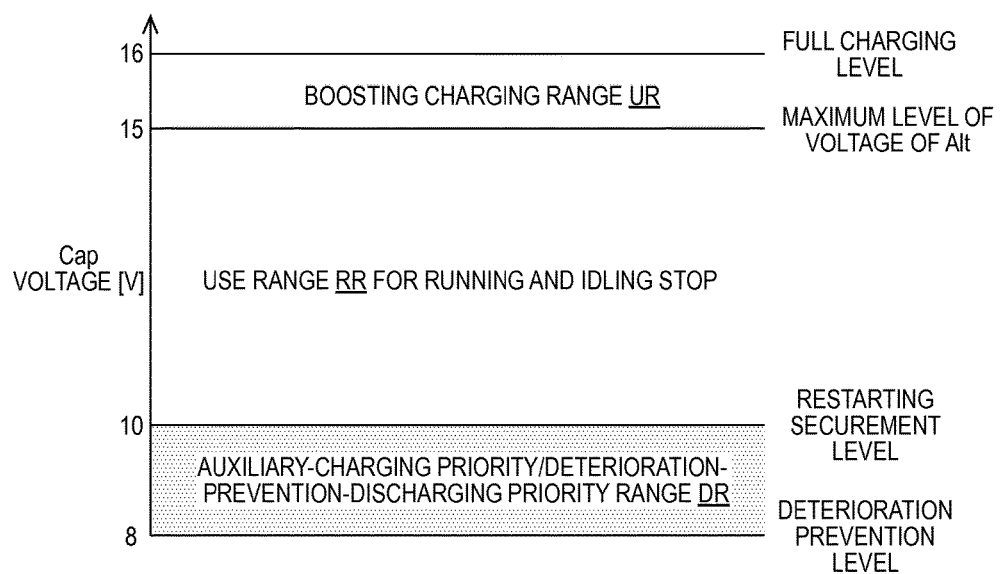
FIG. 16 shows voltage levels of a capacitor.

FIG. 16 shows the charged-state level of the capacitor 5. The charged state of the capacitor 5 can be determined with reference to the output voltage of the capacitor 5. FIG. 16 shows 8 V as a deterioration prevention level which is a level to which the output voltage of the capacitor 5 should be dropped after final stop of the vehicle 2 the in order to prevent deterioration of the capacitor 5. Further, FIG. 16 shows 10 V as a restarting securement level which is the output voltage level of the capacitor 5 which is required for restarting from an idling stop. Furthermore, FIG. 16 shows 15 V as the maximum voltage level of the power generator which is the maximum level of the output voltage which is output from the power generator 6 to the capacitor 5. Besides, FIG. 16 shows 16 V as a full charging level which is the maximum voltage level of the charged state of the capacitor 5.

In a case where the charged state of the capacitor 5 is higher than the deterioration prevention level and is equal to or lower than the restarting securement level, the charged state of the capacitor 5 is included in an auxiliary-charging priority/deterioration-prevention-discharging priority range DR. In the case where the charged state of the capacitor 5 is included in the auxiliary-charging priority/deterioration-prevention-discharging priority range DR, when the vehicle 2 runs, the power supply device 1 for a vehicle preferentially performs charging of the capacitor 5; whereas after the vehicle 2 finally stops, the power supply device 1 preferentially performs discharging of the capacitor. In this way, when the vehicle 2 runs, it is possible to sufficiently charge the capacitor 5, and after the vehicle 2 finally stops, it is possible to preferentially perform discharging of the capacitor 5, thereby preventing deterioration thereof.

In a case where the charged state of the capacitor 5 is higher than the restarting securement level, and is equal to or lower than the maximum voltage level of the power generator, the charged state of the capacitor 5 is included in a use range RR for running and idling stop. In the case where the charged state of the capacitor 5 is included in the use range RR for running and idling stop, the power supply device 1 for a vehicle performs charging and discharging of the capacitor 5 during running or idling stop of the vehicle 2. Also, when the vehicle 2 decelerates, the power supply device 1 charges the capacitor 5 with the regenerative electric power of the power generator 6, and otherwise, the power supply device 1 performs discharging of the capacitor 5. In this way, when the vehicle 2 runs, it is possible to sufficiently charge the capacitor 5, and after the vehicle 2 finally stops, it is possible to preferentially perform discharging of the capacitor 5, thereby preventing deterioration thereof. When the vehicle 2 decelerates, the capacitor 5 is charged with the regenerative electric power of the power generator 6. Therefore, it is possible to efficiently charge the capacitor.

In a case where the charged state of the capacitor 5 is higher than the maximum voltage level of the power generator, and is equal to or lower than the full charging level, the charged state of the capacitor 5 is included in a boosting charging range UR. In the case where the charged state of the capacitor 5 is included in the boosting charging range UR, since the output voltage of the capacitor 5 exceeds the output of the power generator 6, the power supply device 1 for a vehicle boosts the output voltage of the power generator 6 by the DC to DC converter 14, thereby performing charging of the capacitor 5. In this way, even in a case where the full charging level exceeds the maximum output voltage of the power generator 6 and the output voltage of the capacitor 5 exceeds the output voltage of the power generator 6, it is possible to fully charge the capacitor 5.

<2-2. Process>

Figure 17:
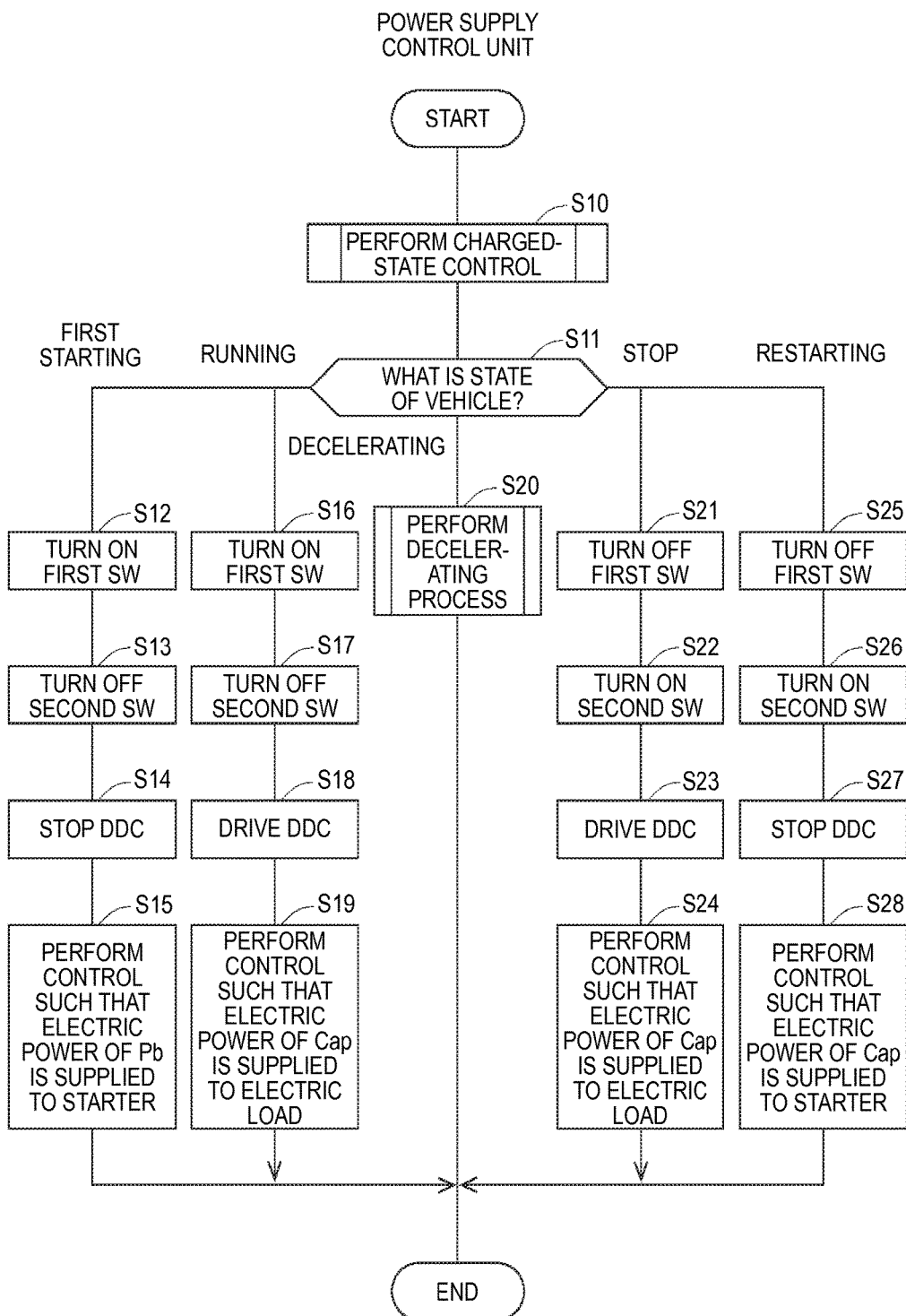
FIG. 17 shows a process of the power supply device for a vehicle according to the second embodiment.

FIG. 17 shows the procedure of a process of the power supply device 1 for a vehicle according to the second embodiment. The procedure of the process of the power supply device 1 for a vehicle according to the second embodiment includes charged-state control of STEP S10 in addition to the procedure of the process of the first embodiment. By the charged-state control, information on the charged states of the lead battery 3 and the capacitor 5 is acquired, and the power supply device 1 for a vehicle is controlled on the basis of the acquired information on the charged states.

If the procedure of the process of the power supply device 1 for a vehicle starts, in STEP S10, the charged-state control is performed. That is, the charged-state control is performed prior to the process of STEP S11 for determining the state of the vehicle 2. Therefore, in preference to the control of the power supply device 1 for a vehicle based on the state of the vehicle 2, control of the power supply device 1 for a vehicle based on the charged states of the lead battery 3 and the capacitor 5 is performed. In this way, the charged states of the lead battery 3 and the capacitor 5 are optimized, at least without being degraded. Therefore, it is possible to stably operate the electric load 4 and perform smooth returning from idling stop.

Figure 18:
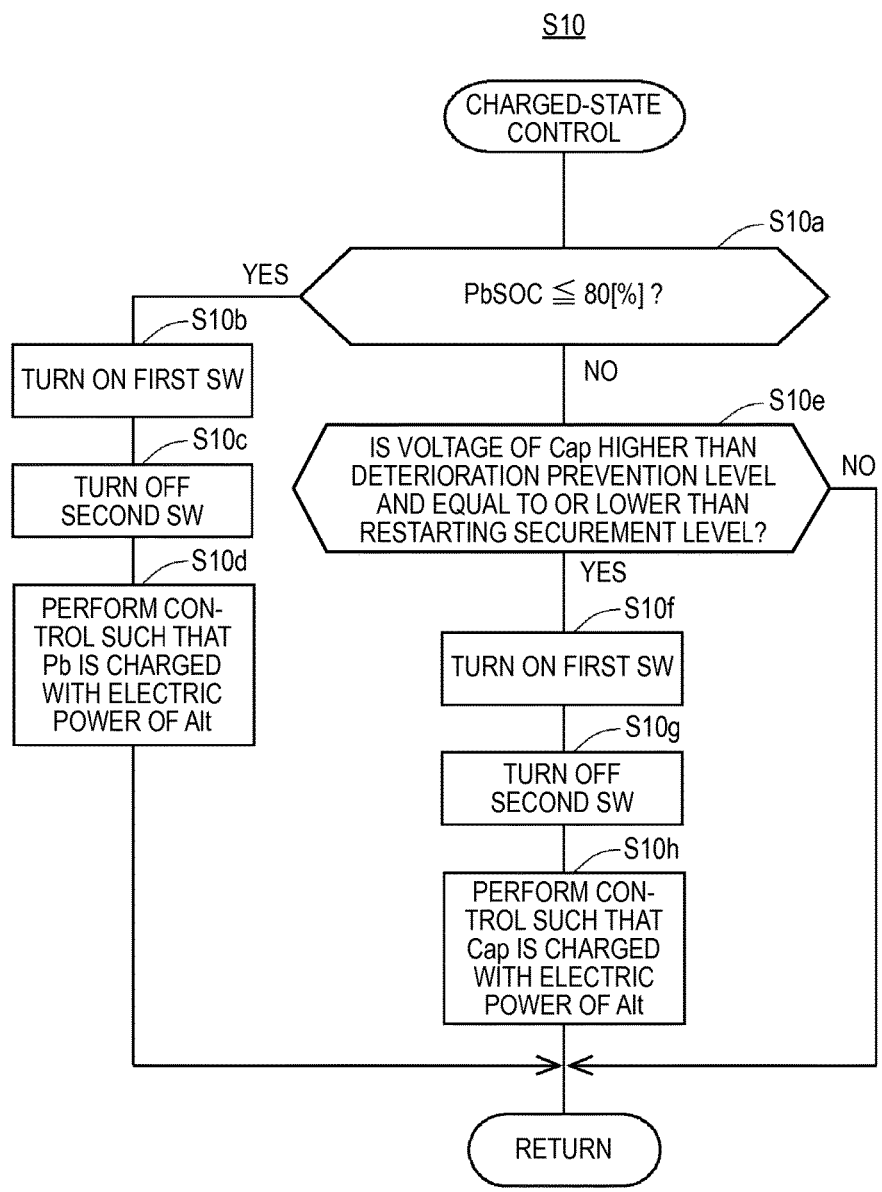
FIG. 18 shows another process of the power supply device for a vehicle according to the second embodiment.

FIG. 18 shows the procedure of detailed processes of the charged-state control. If the charged-state control starts, in STEP S10*a*, the charged-state acquiring unit 13*c* determines whether the charged state of the lead battery 3 is equal to or lower than 80%, that is, the charged state thereof is included in the auxiliary-charging priority range CR.

If the charged-state acquiring unit 13*c* determines that the charged state of the lead battery 3 is equal to or lower than 80% included in the auxiliary-charging priority range CR ("Yes" in STEP S10*a*), with reference to the charged-state data 15*c*, the power supply control unit 13*a* turns on the first switch 11 in STEP S10*b*, and turns off the second switch 12 in STEP S10*c*, and drives the DC to DC converter 14, thereby charging the lead battery 3 with the electric power of the power generator 6 in STEP S10*d*. In this way, in the case where the charged state of the lead battery 3 is equal to or lower than 80%, that is, the charged state thereof is included in the auxiliary-charging priority range CR, it is possible to preferentially charge the lead battery 3.

Meanwhile, if the charged-state acquiring unit 13*c* determines that the charged state of the lead battery 3 is higher than 80%, that is, the charged state thereof is not included in the auxiliary-charging priority range CR ("No" in STEP S10*a*), in STEP S10*e*, the charged-state acquiring unit 13*c* determines whether the charged state of the capacitor 5 is higher than the deterioration prevention level and is equal to or lower than the restarting securement level, that is, whether the charged state thereof is included in the auxiliary-charging priority/deterioration-prevention-discharging priority range DR.

If the charged-state acquiring unit 13*c* determines that the charged state of the capacitor 5 is higher than the deterioration prevention level and is equal to or lower than the restarting securement level ("Yes" in STEP S10*e*), with reference to the charged-state data 15*c*, the power supply control unit 13*a* turns on the first switch 11 in STEP S10*f*, and turns off the second switch 12 in STEP S10*g*, and drives the DC to DC converter 14, thereby charging the capacitor 5 with the electric power of the power generator 6 in STEP S10*d*. In this way, in the case where the charged state of the capacitor 5 is higher than the deterioration prevention level and is equal to or lower than the restarting securement level, that is, the charged state thereof is included in the auxiliary-charging priority/deterioration-prevention-discharging priority range DR, it is possible to preferentially charge the capacitor 5.

In a case where STEP S10d or the STEP S10h is performed, or in a case where charged-state acquiring unit 13c determines that the charged state of the capacitor 5 is equal to or lower than the deterioration prevention level or is higher than the restarting securement level ("No" in STEP S10e), the process returns to the procedure of the process of FIG. 17, and STEP S11 is performed.

<2-3. Circuit Configuration>

Figure 19:
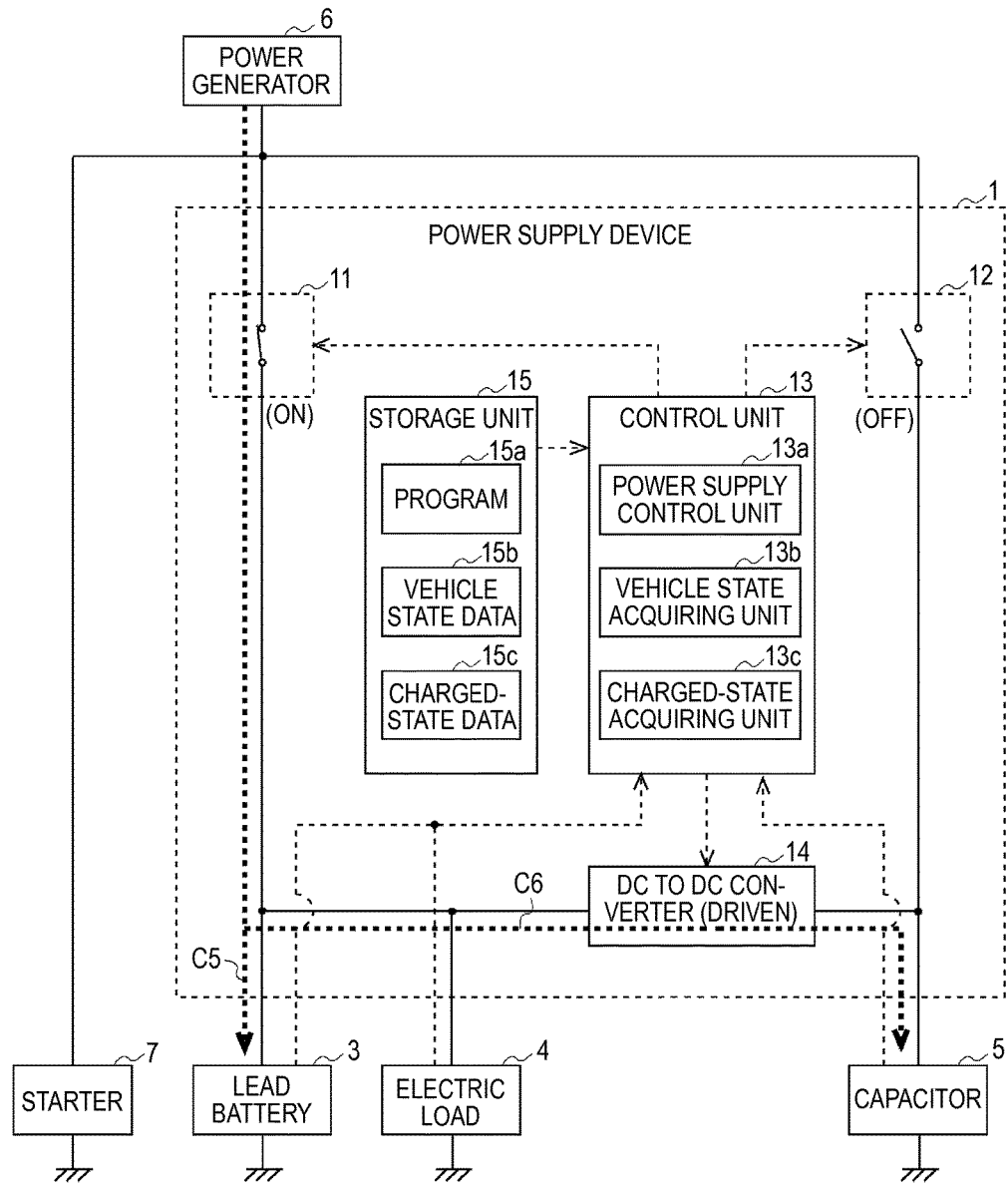
FIG. 19 shows the control states of switches and the transmission path of electric power.

FIG. 19 shows the circuit configuration of the power supply device 1 for a vehicle in the case where the charged state of the lead battery 3 is equal to or lower than 80%. In this case, the power supply device 1 for a vehicle turns on the first switch 11, and turns off the second switch 12, and drives the DC to DC converter 14, thereby charging the capacitor 5 by the power generator 6. In this case, between the power generator 6 and the lead battery 3, a path C5 is formed, and between the power generator 6 and the capacitor 5, a path C6 is formed, whereby it is possible to sufficiently charge the lead battery 3 with the electric power of the power generator 6. Also, it is possible to charge the capacitor 5 with surplus electric power of the power generator 6 through the DC to DC converter 14.

Figure 20:
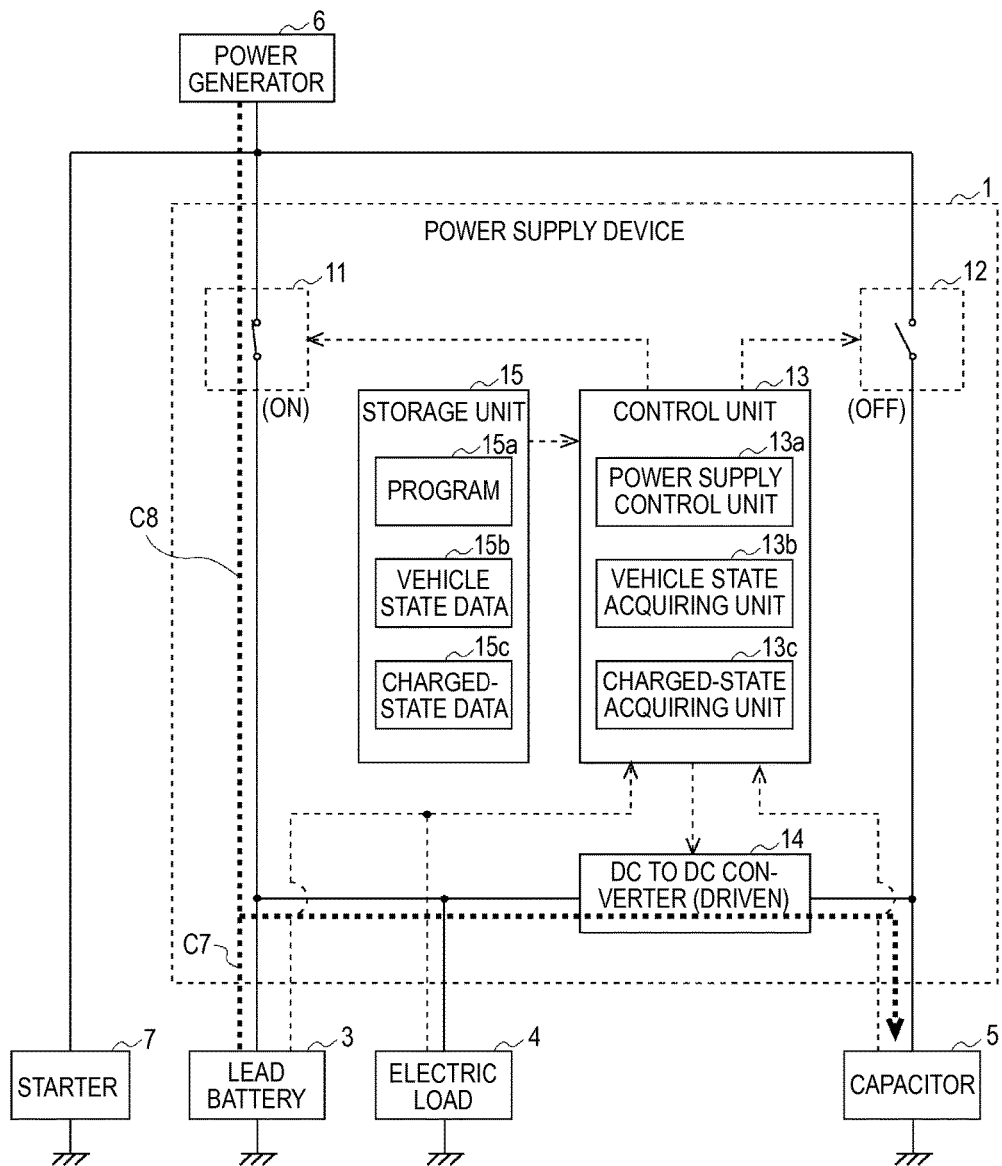
FIG. 20 shows the control states of the switches and the transmission path of electric power.

FIG. 20 shows the circuit configuration of the power supply device 1 for a vehicle in a case where the charged state of the capacitor 5 is higher than the deterioration prevention level and is equal to or lower than the restarting securement level. In this case, the power supply device 1 for a vehicle turns on the first switch 11, and turns off the second switch 12, and drives the DC to DC converter 14, thereby charging the capacitor 5 by the power generator 6 and the lead battery 3. In this case, between the power generator 6 and the capacitor 5, a path C8 is formed, and between the lead battery 3 and the capacitor 5, a path C7 is formed, whereby it is possible to sufficiently charge the capacitor 5 with the electric power of the power generator 6 and the lead battery 3.

As described above, the power supply device 1 for a vehicle according to the second embodiment switches the first switch 11 and the second switch 12 according to the charged states. Therefore, it is possible to appropriately control charging and discharging according to the charged states of the lead battery 3 and the capacitor 5.

Also, in preference to the control of the power supply device 1 for a vehicle based on the state of the vehicle 2, the control of the power supply device 1 for a vehicle based on the charged states of the lead battery 3 and the capacitor 5 is performed. Therefore, the charged states of the lead battery 3 and the capacitor 5 are optimized, at least without being degraded, whereby it is possible to stably operate the electric load 4 and perform smooth returning from idling stop.

3. Modifications

The present invention is not limited to the embodiments described above. The present invention can be modified. Hereinafter, those modifications will be described. The embodiments described above and the following embodiments to be described below can be appropriately combined.

In the embodiments described above, the power supply device 1 for a vehicle includes the DC to DC converter 14. However, the power supply device 1 for a vehicle may be included in the DC to DC converter 14. That is, the DC to DC converter 14 may include the first switch 11, the second switch 12, the control unit 13, and the storage unit 15.

Also, in the embodiments, as a main power supply for electronic devices provided in the vehicle 2, the lead battery 3 with lead electrodes is used. However, the main power supply may not be the lead battery 3. The main power supply needs only to be a secondary battery capable of acting as a power supply for electric devices provided in the vehicle 2. For example, the main power supply may be a silicon battery.

Also, in the embodiments described above, as an auxiliary power supply for electric devices provided in the vehicle 2, the capacitor 5 is used. However, the auxiliary power supply may not be the capacitor 5. The auxiliary power supply needs only to be a secondary battery capable of acting as an auxiliary power supply for electric devices provided in the vehicle 2. For example, the auxiliary power supply may be a lithium-ion battery or a nickel-metal hydride battery.

Also, in the embodiments described above, the power supply device 1 for a vehicle is mounted on the vehicle. However, the power supply device 1 for a vehicle may be mounted on any other transportation devices such as two-wheeled vehicles, trains, aircrafts, and vessels. Also, the power supply device 1 for a vehicle may be mounted on an elevating machine such as an elevator or an escalator. That is, the power supply device 1 for a vehicle can be mounted on any device in which a power supply and an electric load are connected if necessary, whereby charging and discharging of the power supply and supply of electric power to the electric load are controlled.

Also, components described as hardware may be implemented by software. Meanwhile, components described as software may be implemented by hardware. Also, each hardware or software component described above may be implemented by combining hardware and software.

What is claimed is:

1. A power supply device for a vehicle which is used in a vehicle, comprising:
    a first switch unit that is provided between a power generator which is driven by an internal combustion engine of the vehicle and a secondary battery which is connected to the power generator and supplies electric power to a starting device for starting the internal combustion engine and between the starting device and the secondary battery;
    a second switch unit that is provided between the power generator and a capacitor which accumulates electric power supplied by the power generator and between the starting device and the capacitor; and
    a control unit that controls the connection state of the first switch unit and the connection state of the second switch unit, wherein:
    during first starting of the internal combustion engine, the control unit connects the first switch unit and opens the second switch unit, resulting in a first connection state in which electric power is supplied from the secondary battery to the starting device, and
    during restarting of the internal combustion engine from a temporal stop state thereof, the control unit opens the first switch unit and connects the second switch unit, resulting in a second connection state in which electric power is supplied from the capacitor to the starting device.

2. The power supply device for a vehicle according to claim 1, further comprising:
    a direct-current transducer that is provided between a first connection portion at which the secondary battery and the first switch unit are connected and a second connection portion at which the capacitor and the second switch unit are connected, and converts an input direct-current voltage into another direct-current voltage, and outputs the converted direct-current voltage, wherein during the first starting of the internal combustion engine, the control unit connects the first switch unit and opens the second switch unit, resulting in a third connection state in which electric power which is generated by the power generator is supplied from the power generator to the capacitor through the direct-current transducer, and during decelerating of the vehicle, the control unit connects the second switch unit, resulting in a fourth connection state in which regenerative electric power which is generated by the power generator is supplied from the power generator to the capacitor without passing through the direct-current transducer.

3. The power supply device for a vehicle according to claim 1, further comprising:

an acquiring unit that acquires information on charged states of the secondary battery and the capacitor, wherein, if the charged state of the secondary battery is equal to or lower than a first threshold value or the charged state of the capacitor is equal to lower than a second threshold value, regardless of a state of the vehicle, the control unit connects the first switch unit and opens the second switch unit, resulting in a fifth connection state.

4. A power supply device for a vehicle which is used in a vehicle, comprising:

a first switch unit that is provided between a power generator which is driven by an internal combustion engine of the vehicle and a secondary battery which is connected to the power generator and supplies electric power to a starting device for starting the internal combustion engine;

a second switch unit that is provided between the power generator and a capacitor which accumulates electric power supplied by the power generator; and a control unit that controls the connection state of the first switch unit and the connection state of the second switch unit, wherein:

the first switch unit includes a first MOSFET, the second switch unit includes a second MOSFET, the first MOSFET has a parasitic diode connecting its drain and its source, and the anode and cathode of the parasitic diode are connected to the power generator and the secondary battery, respectively, and the second MOSFET has a parasitic diode connecting its drain and its source, and the anode and cathode of the parasitic diode are connected to the power generator and the capacitor, respectively.

5. The power supply device for a vehicle according to claim 4, wherein:

after the control unit switches the first MOSFET from an ON state to an OFF state, the control unit turns on the second MOSFET, and after the control unit switches the second MOSFET from the ON state to an OFF state, the control unit turns on the first MOSFET.

* * * * *